(12) United States Patent
Viner et al.

US009735411B2

(10) Patent No.: US 9,735,411 B2
(45) Date of Patent: Aug. 15, 2017

(54) POLYMER FOR USE AS PROTECTIVE LAYERS AND OTHER COMPONENTS IN ELECTROCHEMICAL CELLS

(71) Applicants: Sion Power Corporation, Tucson, AZ (US); BASF SE, Ludwigshafen (DE)

(72) Inventors: Veronika G. Viner, Tucson, AZ (US); Sven Fleischmann, Ludwigshafen (DE)

(73) Assignees: Sion Power Corporation, Tucson, AZ (US); BASF SE, Ludwigshafen (DE)

( * ) Notice: Subject to any disclaimer, the term of this patent is extended or adjusted under 35 U.S.C. 154(b) by 176 days.

(21) Appl. No.: 14/723,132

(22) Filed: May 27, 2015

(65) Prior Publication Data

US 2015/0349310 A1   Dec. 3, 2015

Related U.S. Application Data

(60) Provisional application No. 62/005,667, filed on May 30, 2014.

(51) Int. Cl.
| | |
|---|---|
| H01M 2/16 | (2006.01) |
| C08G 75/00 | (2006.01) |
| H01M 10/0525 | (2010.01) |
| H01M 4/13 | (2010.01) |
| H01M 4/134 | (2010.01) |
| H01M 4/38 | (2006.01) |
| H01M 10/052 | (2010.01) |
| H01M 10/0565 | (2010.01) |
| H01M 2/14 | (2006.01) |
| H01M 4/36 | (2006.01) |

(52) U.S. Cl.
CPC .......... *H01M 2/1673* (2013.01); *C08G 75/00* (2013.01); *H01M 2/1653* (2013.01); *H01M 4/13* (2013.01); *H01M 4/134* (2013.01); *H01M 4/38* (2013.01); *H01M 4/382* (2013.01); *H01M 10/052* (2013.01); *H01M 10/0525* (2013.01); *H01M 10/0565* (2013.01); *H01M 2/145* (2013.01); *H01M 4/366* (2013.01); *H01M 2300/0085* (2013.01)

(58) Field of Classification Search
CPC ............. H01M 2/1653; H01M 2/1673; H01M 10/0252; H01M 10/0565; H01M 10/0525; C08G 75/00; C08G 75/02; C08G 75/0218; C08G 75/024
See application file for complete search history.

(56) References Cited

U.S. PATENT DOCUMENTS

| | | | | |
|---|---|---|---|---|
| 5,834,621 | A * | 11/1998 | Yamamoto | C07C 321/30 560/221 |
| 6,509,418 | B1 * | 1/2003 | Zook | C08G 75/045 525/212 |
| 7,247,408 | B2 | 7/2007 | Skotheim et al. | |
| 7,771,870 | B2 | 8/2010 | Affinito et al. | |
| 7,785,730 | B2 | 8/2010 | Affinito et al. | |
| 8,076,024 | B2 | 12/2011 | Affinito et al. | |
| 8,105,717 | B2 | 1/2012 | Skotheim et al. | |
| 8,197,971 | B2 | 6/2012 | Skotheim et al. | |
| 8,338,034 | B2 | 12/2012 | Affinito et al. | |
| 8,415,054 | B2 | 4/2013 | Skotheim et al. | |
| 8,603,680 | B2 | 12/2013 | Affinito et al. | |
| 8,617,748 | B2 | 12/2013 | Mikhaylik et al. | |
| 8,623,557 | B2 | 1/2014 | Skotheim et al. | |
| 8,728,661 | B2 | 5/2014 | Skotheim et al. | |
| 8,753,771 | B2 | 6/2014 | Skotheim et al. | |
| 8,871,387 | B2 | 10/2014 | Wang et al. | |
| 8,936,870 | B2 | 1/2015 | Affinito et al. | |
| 8,968,928 | B2 | 3/2015 | Wang et al. | |
| 9,005,311 | B2 | 4/2015 | Safont-Sempere et al. | |
| 9,040,197 | B2 | 5/2015 | Affinito et al. | |
| 9,040,201 | B2 | 5/2015 | Affinito et al. | |
| 9,065,149 | B2 | 6/2015 | Skotheim et al. | |
| 2002/0012846 | A1 | 1/2002 | Skotheim et al. | |
| 2006/0127562 | A1 * | 6/2006 | Lewis | H01L 51/0024 427/58 |
| 2006/0222954 | A1 | 10/2006 | Skotheim et al. | |
| 2007/0224502 | A1 | 9/2007 | Affinito et al. | |
| 2008/0014501 | A1 | 1/2008 | Skotheim et al. | |
| 2008/0057397 | A1 | 3/2008 | Skotheim et al. | |
| 2008/0213672 | A1 | 9/2008 | Skotheim et al. | |
| 2009/0068056 | A1 * | 3/2009 | Popov | C22C 21/00 420/532 |
| 2009/0291353 | A1 | 11/2009 | Affinito et al. | |
| 2010/0044274 | A1 * | 2/2010 | Brun | B01J 23/85 208/121 |
| 2010/0129699 | A1 | 5/2010 | Mikhaylik et al. | |
| 2010/0291442 | A1 | 11/2010 | Wang et al. | |
| 2010/0327811 | A1 | 12/2010 | Affinito et al. | |
| 2011/0068001 | A1 | 3/2011 | Affinito et al. | |
| 2011/0177398 | A1 | 7/2011 | Affinito et al. | |
| 2011/0319559 | A1 * | 12/2011 | Kania | C08G 75/045 524/609 |
| 2012/0040104 | A1 | 2/2012 | Keledjian et al. | |
| 2012/0043940 | A1 | 2/2012 | Affinito et al. | |
| 2012/0052397 | A1 | 3/2012 | Mikhaylik et al. | |
| 2012/0276449 | A1 | 11/2012 | Skotheim et al. | |

(Continued)

FOREIGN PATENT DOCUMENTS

WO   WO 2012/136781 A1   10/2012
WO   WO 2014/068036 A1   5/2014

OTHER PUBLICATIONS

International Search Report and Written Opinion for Application No. PCT/EP2015/061660 mailed Sep. 18, 2015.

*Primary Examiner* — Anca Eoff

(74) *Attorney, Agent, or Firm* — Wolf, Greenfield & Sacks, P.C.

(57) ABSTRACT

Polymers for use as protective layers and other components in electrochemical cells are provided. In some embodiments, the electrochemical cell is a lithium-based electrochemical cell.

19 Claims, 5 Drawing Sheets

(56) References Cited

U.S. PATENT DOCUMENTS

| | | |
|---|---|---|
| 2013/0017441 A1 | 1/2013 | Affinito et al. |
| 2013/0084543 A1* | 4/2013 | Liska ..................... C08L 33/06 433/215 |
| 2013/0095380 A1 | 4/2013 | Affinito et al. |
| 2013/0143096 A1 | 6/2013 | Affinito et al. |
| 2013/0216915 A1 | 8/2013 | Affinito et al. |
| 2013/0280605 A1 | 10/2013 | Affinito et al. |
| 2014/0045075 A1 | 2/2014 | Skotheim et al. |
| 2014/0062411 A1 | 3/2014 | Mikhaylik et al. |
| 2014/0072873 A1 | 3/2014 | Wang et al. |
| 2014/0079994 A1 | 3/2014 | Affinito et al. |
| 2014/0123477 A1 | 5/2014 | Safont-Sempere et al. |
| 2014/0127419 A1 | 5/2014 | Fleischmann et al. |
| 2014/0127577 A1 | 5/2014 | Fleischmann et al. |
| 2014/0205912 A1 | 7/2014 | Skotheim et al. |
| 2014/0272565 A1 | 9/2014 | Gronwald et al. |
| 2014/0272594 A1 | 9/2014 | Safont-Sempere et al. |
| 2015/0010804 A1 | 1/2015 | Laramie et al. |
| 2015/0044517 A1 | 2/2015 | Mikhaylik et al. |
| 2015/0086837 A1 | 3/2015 | Laramie et al. |
| 2015/0162586 A1 | 6/2015 | Fleischmann et al. |
| 2015/0180037 A1 | 6/2015 | Gronwald et al. |
| 2015/0236320 A1 | 8/2015 | Laramie et al. |
| 2015/0236322 A1 | 8/2015 | Laramie et al. |
| 2015/0280277 A1 | 10/2015 | Fleischmann et al. |
| 2015/0287986 A1 | 10/2015 | Affinito et al. |
| 2015/0318552 A1 | 11/2015 | Skotheim et al. |
| 2015/0349310 A1 | 12/2015 | Viner et al. |

\* cited by examiner alternating copolymer
(A,B: monomers)

multiphase block copolymer
(A,B: oligomers)

POLYMER FOR USE AS PROTECTIVE LAYERS AND OTHER COMPONENTS IN ELECTROCHEMICAL CELLS

RELATED APPLICATIONS

This application claims priority under 35 U.S.C. §119(e) to U.S. Provisional Patent Application Ser. No. 62/005,667, filed May 30, 2014, and entitled "Polymer for Use as Protective Layers and Other Components in Electrochemical Cells," which is incorporated herein by reference in its entirety for all purposes.

STATEMENT REGARDING FEDERALLY SPONSORED RESEARCH AND DEVELOPMENT

This invention was made with government support under Grant No. DE-AR0000067 awarded by the Department of Energy ARPA-E program (ARPA-E BEEST DE-FOA-00000207-1536). The government has certain rights in the invention.

FIELD OF INVENTION

The present invention generally relates to polymers for use as protective layers and/or other components in electrochemical cells, including alkali metal cells (e.g., a lithium metal or lithium ion cell).

BACKGROUND

Lithium compound-containing electrochemical cells and batteries containing such cells represent modern means for storing energy, with the potential to exceed conventional secondary batteries with respect to capacity and life-time. Also, the use of toxic materials such as lead can be avoided. However, various technical problems including lithium reactivity and the associated cycle life, dendrite formation, electrolyte compatibility, and fabrication and safety problems, have limited the use of such cells and batteries. For example, many lithium-based electrochemical cells include polymeric materials formed from polymerization of acrylate monomers (e.g., polyethylene glycol esters of acrylic acid) on a lithium surface through radical polymerization mechanism. However, the resulting polymers contain ester groups which are susceptible to nucleophilic attack by species present within the electrochemical cell, such as polysulfides generated during sulfur discharge. Polysulfide nucleophilic attack on polymer ester groups can lead to formation of low conductive polymeric thiocarboxylate salts, severing of cross-linking bridges, generation of viscous and low conductive lithium alkoxides, and partial irreversible loss of sulfur.

SUMMARY OF THE INVENTION

The present invention generally relates to polymers for use as protective layers and other components in electrochemical cells. The subject matter of the present invention involves, in some cases, interrelated products, alternative solutions to a particular problem, and/or a plurality of different uses of one or more systems and/or articles.

Polymers, and articles comprising such polymers, are provided. In some cases, the polymer comprises polymerized units of, or is formed by reaction of, a first type of monomer comprising at least two thiol groups, a second type of monomer comprising at least one vinyl group or at least one alkynyl group, and an optional third type of monomer. In some embodiments, the first type of monomer comprises two thiol groups. In some embodiments, the first type of monomer comprises three thiol groups. In some embodiments, the second type of monomer comprises 1-3 vinyl groups (e.g., two vinyl groups). In some embodiments, the second type of monomer comprises 1-3 alkynyl groups (e.g., three alkynyl groups).

In some embodiments, the polymer comprises polymerized units of, or is formed by reaction of, a first type of monomer comprising two thiol groups and a second type of monomer comprising two vinyl groups. In some embodiments, the polymer comprises polymerized units of, or is formed by reaction of, a first type of monomer comprising three thiol groups and a second type of monomer comprising two vinyl groups. In some embodiments, the polymer comprises polymerized units of, or is formed by reaction of, a first type of monomer comprising two thiol groups and a second type of monomer comprising three vinyl groups.

In some embodiments, the first type of monomer is a compound of Formula (A) or Formula (B), $$\text{HS-L}^1\text{-SH} \tag{A}$$

$$R^a C(L^2 SH)_3 \tag{B}$$

wherein:

$L^1$ or $L^2$ is optionally substituted alkylene, optionally substituted heteroalkylene, such as an alkylene oxide chain, optionally substituted cycloalkylene, optionally substituted heterocycloalkylene, optionally substituted arylene, or optionally substituted heteroarylene; and $R^a$ is H, alkyl, or $-L^2 SH$.

In some cases, the first type of monomer is a compound of Formula (A), wherein $L^1$ is $-(C_2-C_3\text{-alkylene oxide})_n-(C_2-C_3\text{-alkylene})-$ or $-(C_2-C_3\text{-alkylene oxide})_n-C(O)-(C_2-C_3\text{-alkylene})$, wherein the $C_2-C_3$-alkylene oxide is independently ethylene oxide or 1,2-propylene oxide, wherein n is an integer from 1 to 100. In some embodiments, n is an integer from 1 to 10.

In some cases, the first type of monomer is a compound of Formula (B), wherein $L^2$ is $-(C_2-C_3\text{-alkylene})-(C_2-C_3\text{-alkylene oxide})_n-(C_2-C_3\text{-alkylene})-$ or $-(C_1-C_3\text{-alkylene})-(C_2-C_3\text{-alkylene oxide})_n-OC(O)-(C_1-C_3\text{-alkylene})-$, wherein the $C_2-C_3$-alkylene oxide is independently ethylene oxide or 1,2-propylene oxide, $R^a$ is H or alkyl, and n is an integer from 1 to 10.

In one embodiment, the first type of monomer is the following compound,

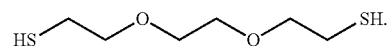

In another embodiment, the first type of monomer is the following compound,

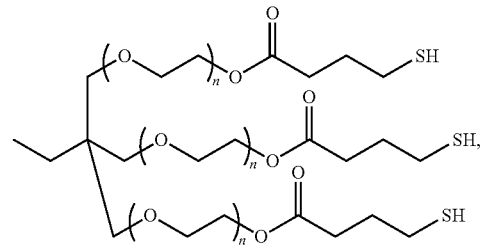

where n is an integer from 1 to 10.

In some embodiments, the second type of monomer is a compound of Formula (C), $$X^1\text{-L}^3\text{-R}^b \tag{C}$$

wherein:

$X^1$ is —$CR^c$=$CH_2$ or —C≡CH;

$L^3$ is optionally substituted alkylene, optionally substituted heteroalkylene, optionally substituted cycloalkylene, optionally substituted heterocycloalkylene, optionally substituted arylene, optionally substituted heteroarylene, —(CO)—, —(CO)O—, —(CO)NH—, —C=NH—, —NH—, —C(OH)—, —O—, or —S—;

$R^b$ is optionally substituted alkyl, optionally substituted heteroalkyl, optionally substituted cycloalkyl, optionally substituted heterocycloalkyl, optionally substituted aryl, or optionally substituted heteroaryl; and $R^c$ is H or alkyl.

In some cases, $L^3$ comprises an alkylene oxide chain, including alkylene oxide chains comprising a copolymer of alkylene oxide units having different chemical structures, such as an alkylene oxide chain comprising a copolymer of ethylene oxide and 1,2-propylene oxide.

In some embodiments, the second type of monomer is a compound of Formula (D), $$X^2\text{-}L^4\text{-}X^3 \quad (D)$$

wherein:

$X^2$ and $X^3$ are —$CR^d$=$CH_2$ or —C≡CH;

$L^4$ is optionally substituted alkylene, optionally substituted heteroalkylene, optionally substituted cycloalkylene, optionally substituted heterocycloalkylene, optionally substituted arylene, optionally substituted heteroarylene, —(CO)—, —(CO)O—, —(CO)NH—, —C=NH—, —NH—, —C(OH)—, —O—, or —S—; and $R^d$ is H or alkyl.

In some cases, $L^4$ comprises an alkylene oxide chain, including alkylene oxide chains comprising a copolymer of alkylene oxide units having different chemical structures, such as an alkylene oxide chain comprising a copolymer of ethylene oxide and 1,2-propylene oxide.

In some embodiments, $L^4$ has the structure, wherein each n is independently 0-10 and $R^6$ is optionally substituted alkylene, optionally substituted heteroalkylene, optionally substituted cycloalkylene, optionally substituted heterocycloalkylene, optionally substituted arylene, or optionally substituted heteroarylene, In some embodiments, $L^4$ is —(O)—($C_2$-$C_3$-alkylene oxide)$_n$-, wherein the $C_2$-$C_3$-alkylene oxide is independently ethylene oxide or 1,2-propylene oxide, and n is an integer from 1 to 10.

In some embodiments, $L^4$ has the structure, wherein:

$R^7$ is optionally substituted alkylene, optionally substituted heteroalkylene, optionally substituted cycloalkylene, optionally substituted heterocycloalkylene, optionally substituted arylene, or optionally substituted heteroarylene.

In some embodiments, the second type of monomer is one of the following compounds, wherein n is an integer from 1-100.

In some embodiments, the third type of monomer comprises at least one, at least two, or more than two functional group(s) reactive with a thiol group. In some embodiments, the third type of monomer comprises one or more isocyanate groups. In some embodiments, the third type of monomer comprises one or more cyanate ester groups. In some embodiments, the third type of monomer comprises one or more thiocyanate groups. In some embodiments, the third type of monomer comprises one or more isothiocyanate groups. In some embodiments, the third type of monomer comprises one or more epoxy groups. In some embodiments, the third type of monomer comprises a combination of isocyanate groups, cyanate ester groups, thiocyanate groups, isothiocyanate groups, and/or epoxy groups.

In some embodiments, the third type of monomer is a compound of Formula (E), $$R^e\text{-}L^5\text{-}R^f \quad (E)$$

wherein $L^5$ is alkylene, arylene, arylene-alkylene-arylene, or alkylene-arylene-alkylene, any of which is optionally substituted; and $R^e$ and $R^f$ are isocyanate groups, cyanate ester groups, thiocyanate groups, isothiocyanate groups, or epoxy groups.

In some cases, $L^5$ is one of the following groups,

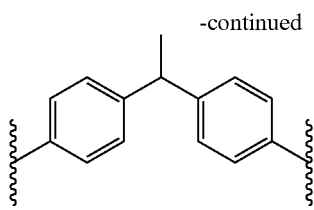

In some embodiments, the third type of monomer is one of the following compounds,

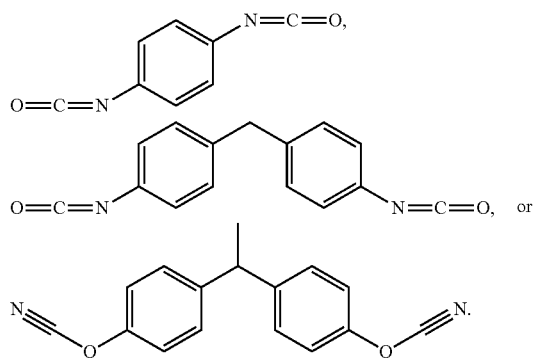

In any of the foregoing embodiments, the ratio of the first type of monomer to the second type of monomer may be between about 1:1 and about 1:5, or about 1:1, or about 1:2, or about 1:3, or about 1:4, or about 1:5. In any of the foregoing embodiments, the ratio of the first type of monomer to the third type of monomer may be about 2:1 and the ratio of the first type of monomer to the second type of monomer may be between about 2:1 and about 2:5, or is about 2:1, or about 2:2, or about 2:3, or about 2:4, or about 2:5.

Articles for use in an electrochemical cell are also provided, wherein the article comprises a polymer as in any of the foregoing embodiments. In some cases, the article may be for use as an electrode. In some cases, the article may be for use as a protective structure or protective layer (e.g., in an electrochemical cell). In some cases, the article may be arranged as a separator within an electrochemical cell. In some embodiments, an article is provided comprising an electroactive layer; and a polymer layer in contact with the electroactive layer and comprising a polymer as described in any of the foregoing embodiments. In some embodiments, the article comprises an anode, a protective layer adjacent to the anode comprising a polymer as in any of the foregoing embodiments, and a cathode.

Electrochemical cells are also provided, wherein the electrochemical cell comprises an anode; a cathode, and a polymer layer comprising a polymer as described in any of the foregoing embodiments arranged adjacent the anode and/or cathode. In some embodiments, the electrochemical cell comprises a cathode; an article comprising a polymer layer and an electroactive layer comprising an anode active material, wherein the polymer layer is arranged between the cathode and the electroactive layer. In some embodiments, electrochemical cells are provided comprising an anode comprising lithium; a protective layer adjacent to the anode comprising a polymer as in any of the foregoing embodiments, and a cathode.

In any of the foregoing embodiments, the electroactive layer may comprise lithium, including lithium metal or a lithium metal alloy. In any of the foregoing embodiments, the anode may comprise lithium, including lithium metal or a lithium metal alloy.

In any of the foregoing embodiments, the cathode may comprise sulfur, such as elemental sulfur, as a cathode active species.

In any of the foregoing embodiments, the conductivity of the polymer layer may be greater than or equal to about $10^{-5}$ S/cm$^2$, greater than or equal to about $10^{-4}$ S/cm$^2$, or greater than or equal to about $10^{-3}$ S/cm$^2$.

In any of the foregoing embodiments, the protective layer may have a thickness of less than 1 μm.

In any of the foregoing embodiments, the protective layer may be formed on a surface of the anode. In any of the foregoing embodiments, the protective layer may be formed on a surface of the cathode.

In any of the foregoing embodiments, the polymer layer or the protective layer may further comprise at least one lithium salt. For example, the lithium salt may be selected from LiNO$_3$, LiPF$_6$, LiBF$_4$, LiClO$_4$, LiAsF$_6$, Li$_2$SiF$_6$, LiSbF$_6$, LiAlCl$_4$, lithium bis-oxalatoborate, LiCF$_3$SO$_3$, LiN(SO$_2$F)$_2$, LiC(C$_j$F$_{2j+1}$SO$_2$)$_3$, wherein j is an integer in the range of from 1 to 20, and salts of the general formula (C$_j$F$_{2j+1}$SO$_2$)$_k$XLi with j being an integer in the range of from 1 to 20, k being 1 when X is selected from oxygen or sulfur, k being 2 when X is selected from nitrogen or phosphorus, and k being 3 when X is selected from carbon or silicon.

In any of the foregoing embodiments, the ionic conductivity of the polymer may be at least about $1 \times 10^{-4}$ S/cm at room temperature in a dry state.

In any of the foregoing embodiments, the polymer may be a gel that is stable to an applied pressure of at least 10 kg/cm$^2$ in a swollen state.

In any of the foregoing embodiments, the thickness of the polymer layer or the protective layer is in the range of about 0.5 um to about 25 um.

In any of the foregoing embodiments, the weight of the polymer may increase by about 10% to about 60%, upon contact with a liquid electrolyte.

Polymers for use as a protective layer, as a separator, or as an electrolyte are also provided, wherein the polymer comprises polymerized units of a first type of monomer comprising at least two thiol groups, a second type of monomer comprising at least one vinyl group or at least one alkynyl group, and an optional third type of monomer, as in any of the foregoing embodiments.

Other aspects, embodiments, and features of the invention will become apparent from the following detailed description when considered in conjunction with the accompanying drawings. The accompanying figures are schematic and are not intended to be drawn to scale. For purposes of clarity, not every component is labeled in every figure, nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
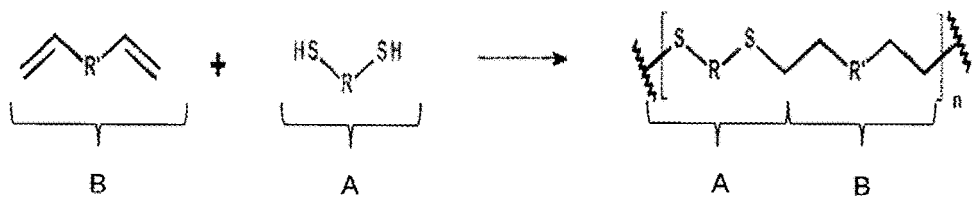
FIG. 1A shows the synthesis of a thiol-ene polymer formed by reaction of a monomer comprising two thiol groups and a monomer comprising two vinyl groups.

Polymers, and more specifically, polymers for use in articles and/or electrochemical cells, are provided. The disclosed polymers may be incorporated into an alkali metal electrochemical cell (e.g., a lithium metal and/or a lithium ion electrochemical cell) as, for example, a protective layer, and/or any other suitable component within the electrochemical cell. Polymers described herein may exhibit enhanced compatibility with battery environments (e.g., in the presence of Li polysulfides, Li surfaces, etc.). For example, the polymers may be stable in the presence of nucleophiles (e.g., polysulfides) that may be present within the article or electrochemical cell, allowing for improved mechanical integrity and/or ionic conductivity. Additionally, the polymers may be rapidly formed and/or cured on various surfaces, such as lithium surfaces.

The polymers disclosed herein may be incorporated within an article, such as an electrode or electrochemical cell, as a protective layer and/or in a protective structure (e.g., a multi-layered structure), as an electrolyte, and/or as a separator. In one example, the polymer may be incorporated within an article (e.g., electrode) containing an electroactive layer and one or more polymers (e.g., polymer layers) as disclosed herein. The polymer may be employed as a protective layer and/or in a protective structure and may be arranged, for example, as a separator between an electroactive material and an electrolyte (or one or more reactive species within the electrolyte). The separation of an electroactive layer from the electrolyte of an electrochemical cell can enhance the performance of the electrochemical cell in various ways, including (e.g., for lithium batteries) reducing or preventing dendrite formation during recharging, reducing or preventing reaction of lithium with the electrolyte or components in the electrolyte (e.g., solvents, salts and/or cathode discharge products), increasing cycle life, and improving safety (e.g., preventing thermal runaway). As an illustrative example, reaction of an electroactive lithium layer with the electrolyte may result in the formation of resistive film barriers on the anode, which can increase the internal resistance of the battery and lower the amount of current capable of being supplied by the battery at the rated voltage.

The polymer may also be incorporated within articles such as electrochemical cells. For example, the article may include an anode (e.g., an anode containing lithium), a protective layer containing the polymer and arranged adjacent to the anode, and a cathode. The electrochemical cells may be, for example, primary batteries or secondary batteries which can be charged and discharged numerous times. For example, the polymers, articles, and/or electrochemical cells described herein can be used in association with lithium-sulfur batteries. The electrochemical cells described herein may also be employed in various applications, including the manufacture/operation of cars, computers, personal digital assistants, mobile telephones, watches, camcorders, digital cameras, thermometers, calculators, laptop BIOS, communication equipment or remote car locks.

A. POLYMERIC COMPOSITIONS

Polymers disclosed herein (e.g., thiol-ene polymers) can be formed by reaction of a first type of monomer comprising at least two thiols groups with a second type of monomer comprising at least one vinyl group or at least one alkynyl group. The reaction may optionally involve a third type of monomer, for example, a monomer containing one or more functional groups reactive with a thiol group.

Various thiol-ene polymers, in particular, are provided. Such polymers may be advantageous for use in articles and electrochemical cells described herein as they may exhibit increased stability in the presence of components of a battery such as a lithium-sulfur battery (e.g., lithium polysulfides, lithium surface, etc.). For example, while other materials may react with polysulfides generated during battery use (e.g., during sulfur discharge) and other nucleophiles present within the battery, thiol-ene polymers disclosed herein may have a decreased amount of, or may be substantially free of, functional groups such as esters that are susceptible to nucleophilic attack. The polymers may include amide groups which are stable to nucleophilic attack by lithium polysulfides. In addition, the amide group containing polymers may exhibit improved adhesion to various surfaces, such as electrode surfaces (e.g., lithium anode surfaces).

The polymers disclosed herein may be copolymers, including random copolymers and block copolymers. Methods for forming the polymers may be fast, robust, and selective. In the case of a thiol-ene polymer, the reaction between a thiol group and a vinyl group generally involves radical addition of a thiol to an olefinic double bond. However, unlike radical chain growth reactions, radically-induced thiol-ene polymerization reactions can generally proceed in a step-growth fashion, allowing for greater control of the resulting macromolecular microstructure and, hence, polymer properties. Furthermore, polymerization of thiol-ene polymers may proceed rapidly on lithium surfaces.

Figure 1B:
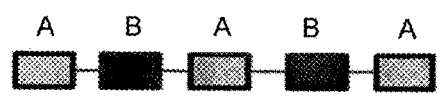
FIG. 1B shows the synthesis of an alternating copolymer by reaction of a monomer comprising two thiol groups and a monomer comprising two vinyl groups.
Figure 1C:
FIG. 1C shows the synthesis of a multiphase block copolymer by reaction of an oligomer comprising two thiol groups and an oligomer comprising two vinyl groups.

Due to the selective nature of the reaction partners (e.g., monomers), thiol-ene polymers can often be constructed in a highly regular, alternating manner. As shown in FIG. 1A, polymerization can involve reacting a first type of monomer containing two thiol groups with a second type of monomer containing two vinyl groups, producing a thiol-ene polymer. FIG. 1B shows a schematic representation of a linear, non-crosslinked thiol-ene polymer. Such materials generally exhibit a relatively low glass transition temperature ($T_g$) originating from the flexible C—S—C thioether bond. Use of oligomeric starting materials (e.g., an oligomer comprising two thiol groups reacted with an oligomer comprising two vinyl groups) can produce multi-segmented block copolymers with induced phase separation where materials parameters can be tailored by the segment ratio, as shown in FIG. 1C. Other methods for producing block copolymers using monomeric starting materials are also known in the art (e.g., "living" polymerization).

It should be noted that depending on the nature of the vinyl group, the polymer may also be formed via Michael addition mechanism. For example, the second type of monomer may include an electron-poor double bond (e.g., an α,β-unsaturated carbonyl group) which can undergo nucleophilic attack by a thiol group of the first type of monomer. Alternatively or in addition, monomers comprising an electron-poor double bond may also progress via an anionic step growth reaction.

Figure 1D:
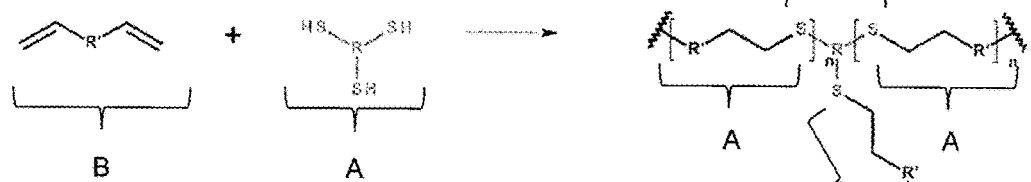
FIG. 1D shows the synthesis of a branched copolymer by reaction of a monomer comprising three thiol groups and a monomer comprising two vinyl groups.

Hyperbranched and/or crosslinked polymers may be produced using at least one monomer that includes more than two reactive functional groups. For example, the first type of monomer may comprise two thiol groups and the second type of monomer may comprise more than two vinyl groups. Alternatively, the first type of monomer may comprise more than two thiol groups and the second type of monomer may comprise two vinyl groups, as shown in FIG. 1D. In another example, the first type of monomer may comprise more than two thiol groups and the second type of monomer may comprise more than two vinyl groups. In other cases, a third type of monomer may be introduced to produce hyperbranched and/or crosslinked polymers, as described more fully below.

While much of the discussion herein focuses on first type of monomer comprising two or three thiol groups and/or second type of monomer comprising two or three vinyl groups, it should be understood that such monomers are described by way of example only and that each of the types of monomers disclosed herein may comprise any number of functional groups (e.g., polymerization sites) suitable for a particular application. For example, the first type of monomer may comprise four, five, six, or more thiol groups and/or the second type of monomer may comprise four, five, six, or more vinyl groups. The polymer may be formed by reaction of a first type of monomer comprising at least two thiol groups and a second type of monomer comprising at least two vinyl groups. For example, the first type of monomer may include two, three, or four thiol groups and/or the second type of monomer may include two, three, or four vinyl groups.

In certain cases, the polymer is formed by reaction of a first type of monomer comprising two thiol groups and a second type of monomer comprising two vinyl groups. In some cases, the polymer is formed by reaction of a first type of monomer comprising two thiol groups and a second type of monomer comprising three vinyl groups. In some cases, the polymer is formed by reaction of a first type of monomer comprising three thiol groups and a second type of monomer comprising two vinyl groups. In some cases, the polymer is formed by reaction of a first type of monomer comprising three thiol groups and a second type of monomer comprising three vinyl groups.

The monomers may be provided in any suitable ratio. In some cases, the ratio of the first type of monomer to the second type of monomer is between about 1:1 and about 1:5, or about 1:1, or about 1:2, or about 1:3, or about 1:4, or about 1:5.

The ratio of the first type of monomer comprising at least two thiol groups to the third type of monomer may be about 2:1 and the ratio of the first type of monomer comprising at least two thiol groups to the second type of monomer comprising at least two vinyl groups may be between about 2:1 and about 2:5, or is about 2:1, or about 2:2, or about 2:3, or about 2:4, or about 2:5.

The first type of monomer can include, for example, two thiol groups, three thiol groups, or more. For example, the first type of monomer may be a compound of Formula (A) or Formula (B),

HS-L$^1$-SH                                                           (A)

R$^a$C(L$^2$SH)$_3$                                          (B)

wherein:

$L^1$ or $L^2$ is optionally substituted alkylene, optionally substituted heteroalkylene, such as an alkylene oxide chain, optionally substituted cycloalkylene, optionally substituted heterocycloalkylene, optionally substituted arylene, or optionally substituted heteroarylene; and $R^a$ is H, alkyl, or -L$^2$SH. For example, $L^1$ or $L^2$ may include an alkylene oxide chain, such as alkylene oxide chains which contain alkylene oxide units having different chemical structures (e.g., $C_2$-alkylene oxides, $C_3$-alkylene oxides, and the like).

The first type of monomer may be a compound of Formula (A), HS-L$^1$-SH, wherein $L^1$ is —($C_2$-$C_3$-alkylene oxide)$_n$-($C_2$-$C_3$-alkylene)- or —($C_2$-$C_3$-alkylene oxide)$_n$-C(O)—($C_2$-$C_3$-alkylene), wherein the $C_2$-$C_3$-alkylene oxide is independently ethylene oxide or 1,2-propylene oxide, wherein n is an integer from 1 to 100, such as an integer from 1 to 10.

The first type of monomer may also be a compound of Formula (B), R$^a$C(L$^2$SH)$_3$, wherein $L^2$ is —($C_1$-$C_3$-alkylene)-($C_2$-$C_3$-alkylene oxide)$_n$-($C_1$-$C_3$-alkylene)- or —($C_1$-$C_3$-alkylene)-($C_2$-$C_3$-alkylene oxide)$_n$-OC(O)—($C_1$-$C_3$-alkylene)-, wherein the $C_2$-$C_3$-alkylene oxide is independently ethylene oxide or 1,2-propylene oxide, $R^a$ is H or alkyl, and n is an integer from 1 to 10.

Examples of the first type of monomer include the following compounds,

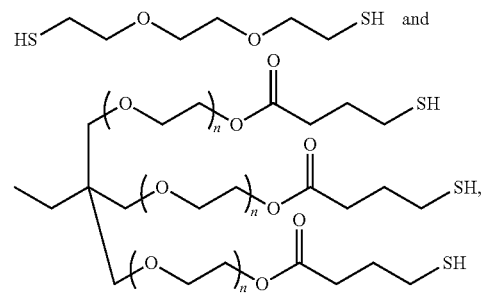

where n is an integer from 1 to 10.

The second type of monomer may include at least one group capable of reacting with the first type of monomer to form a polymer. For example, the second type of monomer may contain at least one vinyl group, such as 1-3 vinyl groups (e.g., two vinyl groups). The second type of monomer may also contain at least one alkynyl group, such as 1-3 alkynyl groups (e.g., three alkynyl groups).

The second type of monomer may be a compound of Formula (C),

  (C)

wherein:
X$^1$ is —CR$^c$═CH$_2$ or —C≡CH;
L$^3$ is optionally substituted alkylene, optionally substituted heteroalkylene, optionally substituted cycloalkylene, optionally substituted heterocycloalkylene, optionally substituted arylene, optionally substituted heteroarylene, —(CO)—, —(CO)O—, —(CO)NH—, —C═NH—, —NH—, —C(OH)—, —O—, or —S—;
R$^b$ is optionally substituted alkyl, optionally substituted heteroalkyl, optionally substituted cycloalkyl, optionally substituted heterocycloalkyl, optionally substituted aryl, or optionally substituted heteroaryl; and
R$^c$ is H or alkyl.

The second type of monomer may also be compound of Formula (D),

  (D)

wherein:
X$^2$ and X$^3$ are —CR$^d$═CH$_2$ or —C≡CH;
L$^4$ is optionally substituted alkylene, optionally substituted heteroalkylene, optionally substituted cycloalkylene, optionally substituted heterocycloalkylene, optionally substituted arylene, optionally substituted heteroarylene, —(CO)—, —(CO)O—, —(CO)NH—, —C═NH—, —NH—, —C(OH)—, —O—, or —S—; and
R$^d$ is H or alkyl.

In Formula (C) or Formula (D), L$^3$ or L$^4$ may contain an alkylene oxide chain, including alkylene oxide chains comprising a copolymer of alkylene oxide units having different chemical structures, such as an alkylene oxide chain comprising a copolymer of ethylene oxide and 1,2-propylene oxide.

The second type of monomer may be a compound of Formula (D), wherein L$^4$ has the structure,

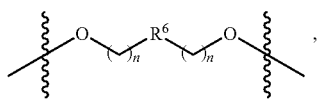

wherein each n is independently 0-10 and R$^6$ is optionally substituted alkylene, optionally substituted heteroalkylene, optionally substituted cycloalkylene, optionally substituted heterocycloalkylene, optionally substituted arylene, or optionally substituted heteroarylene. Alternatively, L$^4$ may be —(O)—(C$_2$-C$_3$-alkylene oxide)$_n$-, wherein the C$_2$-C$_3$-alkylene oxide is ethylene oxide or 1,2-propylene oxide, and n is an integer from 1 to 10, The second type of monomer may also be a compound of Formula (D), wherein L$^4$ has the structure,

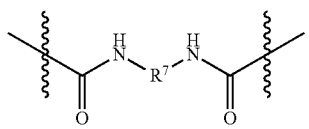

wherein:
R$^7$ is optionally substituted alkylene, optionally substituted heteroalkylene, optionally substituted cycloalkylene, optionally substituted heterocycloalkylene, optionally substituted arylene, or optionally substituted heteroarylene. For example, R$^7$ may contain an alkylene chain or an alkylene oxide chain, including alkylene oxide chains comprising a copolymer of alkylene oxide units having different chemical structures, such as an alkylene oxide chain comprising a copolymer of ethylene oxide and 1,2-propylene oxide.

Examples of the second type of monomer include the following compounds,

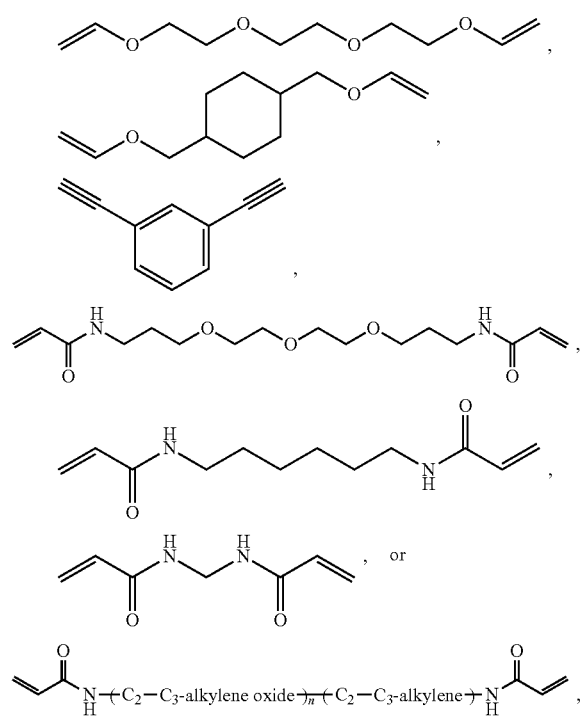

wherein n is an integer from 1-100. The C$_2$-C$_3$-alkylene oxide may be, for example, ethylene oxide or 1,2-propylene oxide.

The third type of monomer comprises at least one, at least two, or more than two functional group(s) reactive with a thiol group, such as isocyanate groups, cyanate ester groups, thiocyanate groups, isothiocyanate groups, epoxy groups, or combinations thereof. For example, the third type of monomer may be a compound of Formula (E), R$^e$-L$^5$-R$^f$  (E)

wherein L$^5$ is alkylene, arylene, arylene-alkylene-arylene, or alkylene-arylene-alkylene, any of which is optionally substituted, such as

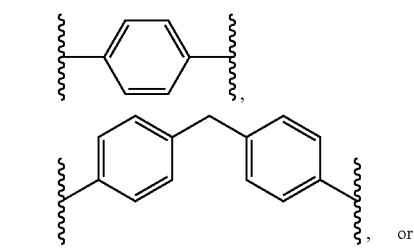

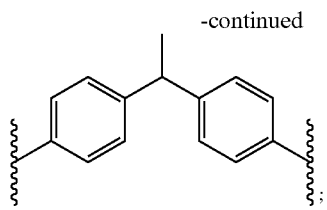

and $R^e$ and $R^f$ are isocyanate groups, cyanate ester groups, thiocyanate groups, isothiocyanate groups, or epoxy groups. Examples of the third type of monomer include the following compounds,

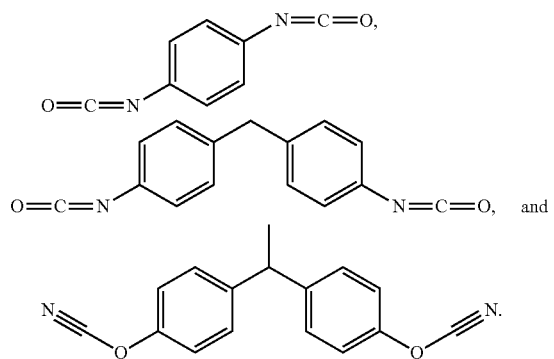

Incorporation of the third type of monomer may provide the ability to produce crosslinked polymer structures. For example, the third type of monomer may include a first functional group that reacts with (e.g., forms a bond with) a thiol group, a vinyl group, and/or an alkynyl group of a first polymer chain and a second functional group that reacts with (e.g., forms a bond with) a thiol group, a vinyl group, and/or an alkynyl group of a second polymer chain, thereby forming a crosslink between the first and second polymers. Typically, an isocyanate group, cyanate ester group, thiocyanate group, isothiocyanate group, or epoxy group on the third type of monomer may undergo nucleophilic attack from a thiol group on the first type of monomer or on a polymer.

Figure 6A:
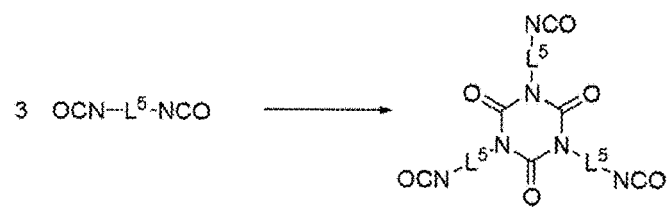
FIGS. 6A and 6B show cycloaddition reactions involving (a) monomers containing two isocyanate groups and (b) monomers containing two cyanate ester groups.
Figure 6B:
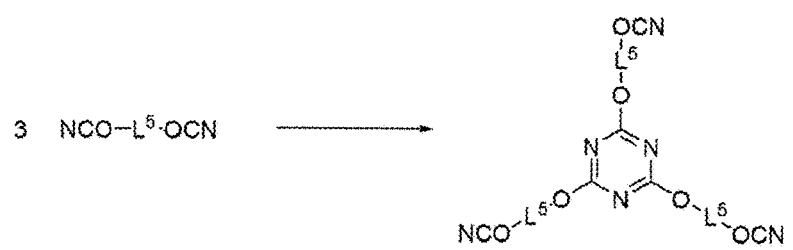

The third monomer may also undergo a cycloaddition reaction with a functional group of another monomer or a polymer to form a cyclic structure. In some cases, a cycloaddition reaction may take place between multiple third monomers to form a cyclic structure. Such cyclic structures may enhance the stability and/or mechanical integrity of the polymers, and may otherwise improve performance of the article or electrochemical cell. For example, the third monomer may include two isocyanate groups, one of which may undergo a cycloaddition reaction with isocyanate groups of two other third monomers to form a substituted, six-membered heterocyclic ring, as shown in FIG. 6A. In some cases, at least one isocyanate group present on a polymer may react via a cycloaddition reaction with isocyanate groups of other monomers or polymers to form a substituted, six-membered heterocyclic ring. In another example, the third monomer may include two cyanate ester groups, one of which may undergo a cycloaddition reaction with cyanate ester groups of two other third monomers to form a substituted triazine ring. (FIG. 6B) In some cases, at least one cyanate ester group present on a polymer may react via a cycloaddition reaction with cyanate ester groups of other monomers or polymers to form a substituted triazine ring. Such cyclic structures may serve as crosslinking groups (e.g., between two polymers).

The polymer may be formed using methods known in the art. Polymerization may be performed in the presence of a solvent, or, in some cases, in the absence of solvent. The polymer may be formed upon exposure to UV light, optionally in the presence of a photoinitiator. For example, a mixture of monomers as described herein may be combined with a solvent in the presence of a photoinitiator to form a pre-polymer solution. The polymerization may be carried out on a surface, for example, by first exposing the surface to the pre-polymer solution. The pre-polymer solution may then be exposed to electromagnetic radiation (e.g., UV radiation) to initiate polymerization. In some cases, the pre-polymer solution may be applied to the surface to form a film or layer containing the mixture of monomers on the surface, which may then be exposed to electromagnetic radiation to initiate polymerization. The first, second, and/or third types of monomers may be polymerized simultaneously. If desired, any of the first, second, and/or third types of monomers may be polymerized sequentially.

Polymerization may be carried out for any suitable period of time to produce the desired polymer. In some cases, the reaction is carried out in a period of time required for the reaction to be substantially complete, and in some cases, the time may be kept to the minimum time necessary for the reaction to be substantially complete. Termination of polymerization may be conducted using methods known in the art. For example, monofunctional monomers can be added as terminating agents and/or to reduce the chain length of the polymer. In some cases, polymerization may be terminated simply by cessation of exposure to electromagnetic radiation.

In some cases, the polymerization may be carried out on the surface of an electroactive material (e.g., a metal such as lithium or a metal alloy such as a lithium alloy). The formation of the polymer on the surface of an electroactive material may have many advantages. For example, the polymer may be capable of conducting lithium cations but not other, undesirable cations/anions that may be present (e.g., polysulfide anions which may be present in embodiments involving a sulfur cathode). As a result, the electro active material may be protected from adverse reactions and/or the cycle life of the electrochemical cell may increase. Alternatively, the polymerization may be carried out on the surface of a protective layer (e.g., a ceramic, glass).

Any suitable solvent may be utilized in the polymerization reaction (e.g., to form a pre-polymer solution). The solvent may be selected to have a low boiling point and/or to be substantially unreactive with the monomers and/or reaction components. The solvent may be non-aqueous, aqueous, or a mixture thereof. Examples of non-aqueous solvents include, but are not limited to, non-aqueous organic solvents, such as, for example, N-methyl acetamides, such as dimethylacetaminde (DMAc) acetonitrile, acetals, ketals, esters (e.g., butanone), carbonates, sulfones, sulfites, sulfolanes, aliphatic ethers, acyclic ethers, cyclic ethers, glymes, polyethers, phosphate esters, siloxanes, dioxolanes, N-alkylpyrolidones, such as N-methyl pyrolidone (NMP), substituted forms of the foregoing, and blends thereof. Examples of acyclic ethers that may be used include, but are not limited to, diethyl ether, dipropyl ether, dibutyl ether, dimethoxymethane (DME), trimethoxymethane, dimethoxyethane, diethoxyethane, 1,2-dimethoxypropane, and 1,3-dimethoxypropane. Examples of cyclic ethers that may be used include, but are not limited to, tetrahydrofuran, tetrahydropyran (THF), 2-methyltetrahydrofuran, 1,4-dioxane, 1,3-dioxolane (DOL), and trioxane. Examples of polyethers that may be used include, but are not limited to, diethylene glycol dimethyl ether (diglyme), triethylene glycol dimethyl ether (triglyme), tetraethylene glycol dimethyl ether (tetraglyme), higher glymes, ethylene glycol divinyl ether, diethylene glycol divinyl ether, triethylene glycol divinyl ether, dipropylene glycol dimethyl ether, and butylene glycol ethers. Examples of sulfones that may be used include, but are not limited to, sulfolane, 3-methyl sulfolane, and 3-sulfolene. Fluorinated derivatives of the foregoing are also useful as liquid electrolyte solvents. Mixtures of the solvents described herein can also be used.

Typical solvents utilized in the polymerization of polymers disclosed herein include butanone (also referred to as methyl ethyl ketone or MEK) and dioxolane.

Any suitable photoinitiator can be used to aid in polymerization of the polymer. In some cases, the photoinitiator is a radical photoinitiator. A non-limiting example of a radical photoinitiator includes bis(2,4,6-trimethylbenzoyl)-phenylphosphineoxide (e.g., Irgacure® 819).

Polymerization may be conducted in an inert atmosphere, for example, under vacuum or an atmosphere of inert gas (e.g., nitrogen, argon). In some embodiments, the reaction is carried out at atmospheric pressure.

The reaction may be conducted at any suitable temperature. In some embodiments, the reaction is carried out at a temperature between about 20 to 70° C. In certain (although not all) instances, the reaction being carried out at a temperature of about room temperature can be preferred.

Following formation of the polymer (e.g., on a surface), the polymer may be dried. For example, the polymer may be heated and/or placed under vacuum, thereby removing residual solvent or left to stand for a suitable period of time (e.g., overnight) to allow the solvent to evaporate. In some cases, the polymer is heated to a temperature between 50° C. and 200° C., or between 50° C. and 140° C., or between 50° C. and 100° C. Other ranges of temperature are also possible.

It should be appreciated that other components can also be included in the pre-polymer solution and/or resulting polymer. For example, one or more alkali metal salts (e.g., lithium salts), such as those described herein, may be present in some instances. The polymer (e.g., a protective polymer layer or a polymer gel layer) and/or an electrolyte may include one or more ionic electrolyte salts, also as known in the art, to increase the ionic conductivity. The salt can be selected from salts of lithium or sodium. In particular, if the anode or cathode contains lithium, the salt may be a lithium salt.

Suitable lithium salts may be selected from, for example, $LiNO_3$, $LiPF_6$, $LiClO_4$, $LiAsF_6$, $Li_2SiF_6$, $LiSbF_6$, $LiAlCl_4$, lithium bis-oxalatoborate (LiBOB), $LiCF_3SO_3$, $LiN(SO_2F)_2$, $LiC(C_jF_{2j+1}SO_2)_3$ wherein j is an integer in the range of from 1 to 20, and salts of the general formula $(C_jF_{2j+1}SO_2)_kXLi$ with j being an integer in the range of from 1 to 20, k being 1 when X is selected from oxygen or sulphur, k being 2 when X is selected from nitrogen or phosphorus, and k being 3 when X is selected from carbon or silicium. Suitable salts are selected from $LiC(CF_3SO_2)_3$, $LiN(CF_3SO_2)_2$, $LiN(SO_2F)_2$, $LiPF_6$, $LiBF_4$, $LiClO_4$, and $LiCF_3SO_3$. The concentration of salt in solvent can be in the range of from about 0.5 to about 2.0 M, from about 0.7 to about 1.5 M, or from about 0.8 to about 1.2 M (wherein M signifies molarity, or moles per liter). Other suitable lithium salts are described herein.

Polymer layers for use in the electrochemical cells as described herein may include a mixture of the polymers described herein and/or may be combined with other polymeric materials. For example, the polymer layer may include a blend of a thiol-ene polymer described herein and a polyether homopolymer or a polyether copolymer. Non-limiting examples of polyether homopolymers or polyether copolymers include PEO, PPO, and pTHF, or copolymers thereof (e.g., Alkox EP®-series). The ratio of the thiol-ene polymer (e.g., from Section A) to the additional polymer (e.g., polyether homopolymer or polyether copolymer) may be between about 5:95 and about 95:5, such as between 75:25 and 25:75.

B. ELECTROCHEMICAL CELLS

Having generally described the types of suitable polymer compositions, the incorporation of the polymers described in Section A into electrochemical cells will now be described. While many embodiments described herein describe lithium-based electrochemical cells, it is to be understood that any analogous alkali metal electrochemical cells (including alkali metal anodes) can be used.

As described herein, the polymers may find use in an article such as an electrode (e.g., an anode such as a Li-anode, or a cathode such as a sulfur cathode) or in an electrochemical cell as a protective layer and/or protective structure (e.g., a multi-layered structure). The protective layer and/or protective structure may be arranged to physically separate or at least reduce contact between components within the electrochemical cell, such as an electroactive material and an electrolyte (or a species within an electrolyte). For example, for lithium-sulfur electrochemical cells, a protective layer including a polymer as disclosed herein may advantageously reduce or prevent contact between polysulfide species (e.g., polysulfide anions) from contacting a lithium surface within the cell (e.g., anode). The protective layer and/or protective structure may also be substantially impermeable to the electrolyte (or a species within the electrolyte). In certain cases, the protective layer and/or protective structure may be substantially unswollen in the presence of the electrolyte. The protective layer and/or protective structure may be arranged in direct, physical contact with an electroactive material, or may be physically separated from an electroactive material via one or more intervening layers.

The protective layer and/or protective structure may, in some cases, be substantially non-porous. However, it should be understood that in certain embodiments a porous protective layer or structure may be desired. For example, the protective layer and/or protective structure may have an average pore size of less than or equal to 10 microns, less than or equal to 5 microns, less than or equal to 2 microns, less than or equal to 1 micron, less than or equal to 0.5 microns, less than or equal to 0.1 microns, less than or equal to 50 nm, less than or equal to 20 nm, less than or equal to 10 nm, or less than or equal to 5 nm.

One or more layers containing the polymers described herein may be positioned between the active surface of an electroactive material and an electrolyte. For example, the polymer layer(s) may serve as a protective layer for an anode. In another example, the polymer layer (s) may serve as a protective layer for a cathode (e.g., in instances where the cathode surface is not smooth).

While a variety of techniques and components for protection of lithium and other alkali metal anodes are known, these protective layers present particular challenges, especially in rechargeable batteries. Since lithium batteries function by removal and re-plating of lithium from a lithium anode in each discharge/charge cycle, lithium ions must be able to pass through any protective layer. The protective layer must also be able to withstand morphological changes as material is removed and re-plated at the anode. The effectiveness of the protective layer in protecting an electroactive layer may also depend, at least in part, on how well the protective layer is integrated with the electroactive layer, the presence of any defects in the layer, and/or the smoothness of the layer(s). Protective layers which permit sufficient passage of lithium ions can advantageously force a substantial amount of the Li surface to participate in current conduction, protecting the metallic Li anode against certain species (e.g., liquid electrolyte and/or polysulfides generated from a sulfur-based cathode) migrating from the cathode, and impeding high current density-induced surface damage. However, any single thin film materials, when deposited on the surface of an electroactive lithium layer, do not have all of the necessary properties that allow sufficient passage of Li ions therethrough.

In some instances, solutions to the problems described herein involve the use of an article including an anode comprising lithium, or any other appropriate electroactive material, and a protective layer comprising a herein-disclosed polymer positioned between an electroactive layer and an electrolyte of the cell. The protective layer may be a single layer of polymer (e.g., thiol-ene polymer).

The articles described herein may include a multi-layered structure comprising a polymer as described herein, positioned between an electroactive layer and an electrolyte of an electrochemical cell (e.g., as a protective layer or structure). The multi-layered structure may include, for example, at least a first ion conductive material layer (e.g., a ceramic layer, a glassy layer, a glassy-ceramic layer, or a secondary polymer layer) and at least a first polymeric layer formed from one or more of the polymers disclosed herein and positioned adjacent the ion conductive material. In this embodiment, the multi-layered structure can optionally include several sets of alternating ion conductive material layers and polymeric layers, and/or can include layers of different polymers. The multi-layered structures can allow for sufficient passage of lithium ions, while limiting passage of certain chemical species that may adversely affect the anode (e.g., species in the electrolyte). This arrangement can provide significant advantages, as polymers can be selected to impart flexibility to the system where it can be needed most, namely, at the surface of the electrode where morphological changes occur upon charge and discharge.

Ionic compounds (i.e., salts) may also be included in the disclosed polymers and polymer layers. For example, lithium salts may be advantageously included in a polymer layer in relatively high amounts. Inclusion of the lithium and/or other salts may increase the ion conductivity of the polymer. Increases in the ion conductivity of the polymer may enable enhanced ion diffusion between associated anodes and cathodes within an electrochemical cell. Therefore, inclusion of the salts may enable increases in specific power available from an electrochemical cell and/or extend the useful life of an electrochemical cell due to the increased diffusion rate of the ion species therethrough.

Figure 2A:
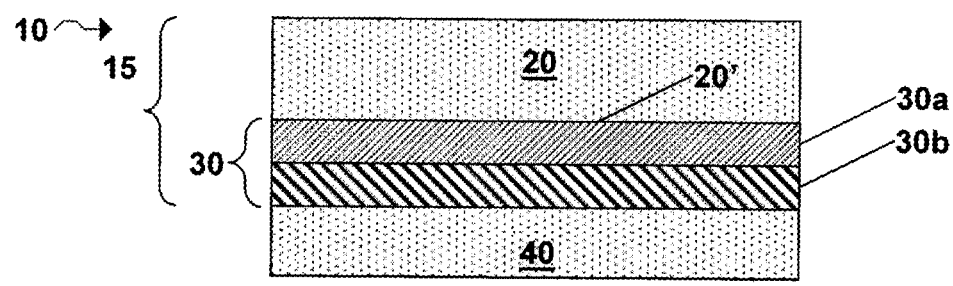
FIG. 2A shows an article including a protective structure for use in an electrochemical cell.

Turning now to the figures, FIG. 2A shows a specific example of an article that can be used in an electrochemical cell. Article 10 includes an electrode 15 (e.g., an anode or a cathode) including an electroactive layer 20 that comprises an electroactive material (e.g., lithium metal). The electroactive layer may be covered by a protective structure 30, which can include, for example, an ion conductive layer 30a (e.g., a ceramic layer, a glassy layer, a glassy-ceramic layer, or a secondary polymer layer) disposed on an active surface 20' of the electroactive layer 20 and a polymer layer 30b formed from one or more of the polymers disclosed herein. The protective structure may act as an effective barrier to protect the electroactive material from reaction with certain species in the electrolyte as described herein. Optionally, article 10 includes an electrolyte 40, which may be positioned adjacent the protective structure, e.g., on a side opposite the electroactive layer. The electrolyte can function as a medium for the storage and transport of ions. Electrolyte 40 may also comprise a gel polymer electrolyte formed from the compositions disclosed herein.

A layer referred to as being "covered by," "on," or "adjacent" another layer means that it can be directly covered by, on, or adjacent the layer, or an intervening layer may also be present. For example, a polymer layer described herein that is adjacent an anode or cathode may be directly adjacent (e.g., may be in direct physical contact with) the anode or cathode, or an intervening layer (e.g., another protective layer) may be positioned between the anode and the polymer layer. A layer that is "directly adjacent," "directly on," or "in contact with," another layer means that no intervening layer is present. It should also be understood that when a layer is referred to as being "covered by," "on," or "adjacent" another layer, it may be covered by, on or adjacent the entire layer or a part of the layer.

It should be appreciated that FIG. 2A is an exemplary illustration and that not all components shown in the figure need be present, or, additional components not shown in the figure may be present. For example, protective structure 30 may be a multilayer structure including 3, 4, 5, or more layers. Although FIG. 2A shows an ion conductive layer 30a disposed directly on the surface of the electroactive layer, polymer layer 30b may be disposed directly on the surface of the electroactive layer. In another example, electrolyte 40 may not be present in the article. Other configurations are also possible.

Figure 2B:
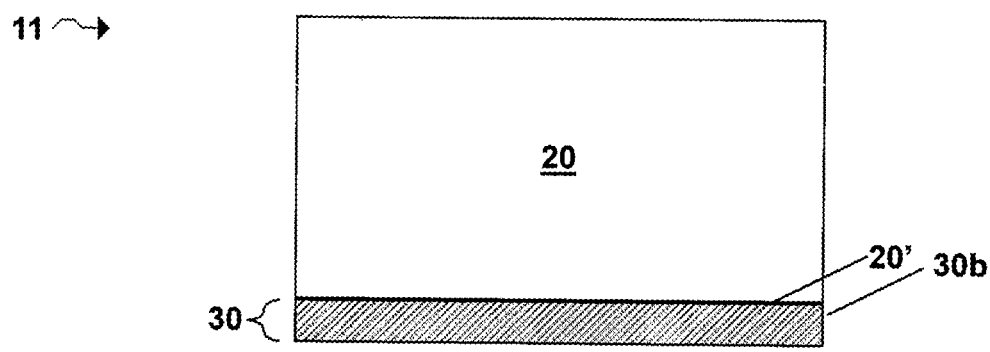
FIG. 2B shows an electrode including an electroactive layer and a polymer layer.

In another example, ion conductive layer 30a is not present and polymer layer 30b is positioned directly adjacent the electroactive layer. As depicted in FIG. 2B, article 11 (e.g., an electrode) includes electroactive layer 20 which is covered by protective structure 30 formed from a single polymer layer 30b. Polymer layer 30b may be formed from the polymers disclosed herein and may be disposed on active surface 20' of the electroactive layer. The article may also include a protective structure containing one or more layers of the disclosed polymers and/or one or more layers of an ion conductive material, as shown illustratively in FIG. 2C. The protective structure may be positioned between the active surfaces of the anode and cathode, such as between an active surface of an electroactive material and the corresponding electrolyte of the cell. The one or more polymer layers and/or one or more ion conductive materials may form a multi-layered structure as described herein.

One advantage of employing a multi-layered structure is the beneficial mechanical properties of the structure. The positioning of a polymer layer adjacent an ion conductive layer can decrease the tendency of the ion conductive layer to crack, and can increase the barrier properties of the structure. Thus, these laminates or composite structures may be more robust towards stress due to handling during the manufacturing process than structures without intervening polymer layers. In addition, a multi-layered structure can also have an increased tolerance of the volumetric changes that accompany the migration of lithium back and forth from the anode during the cycles of discharge and charge of the cell.

Figure 2C:
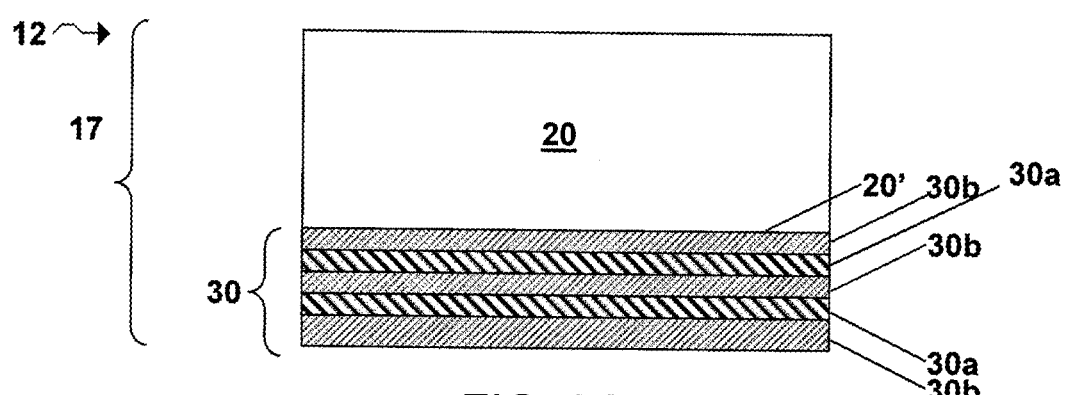
FIG. 2C shows an electrode including an electroactive layer and a multilayer protective structure.

In FIG. 2C, article 12 includes an electrode 17 (e.g., an anode or a cathode) comprising an electroactive layer 20 comprising an electroactive material (e.g., lithium metal). Protective structure 30 is disposed on and covers electroactive layer 20 and is a multi-layered structure including at least a first polymeric layer 30b formed from the polymers disclosed herein. The first polymeric layer is positioned adjacent the electroactive layer and a first ion conductive layer 30a is positioned adjacent the first polymer layer. The multi-layered structure can optionally include several sets of alternating ion conductive material layers 30a and polymeric layers 30b. The multi-layered structures can allow passage of, for example, lithium ions, while limiting passage of certain chemical species that may adversely affect the anode (e.g., species in the electrolyte). This arrangement can provide significant advantages, as the polymers can be selected to impart flexibility to the system where it can be needed most, namely, at the surface of the electrode where morphological changes occur upon charge and discharge. Although FIG. 2C shows a first polymeric layer 30b positioned directly adjacent the electroactive layer, an ion conductive layer 30a may be directly adjacent the electroactive layer. Other configurations are also possible.

Figure 3:
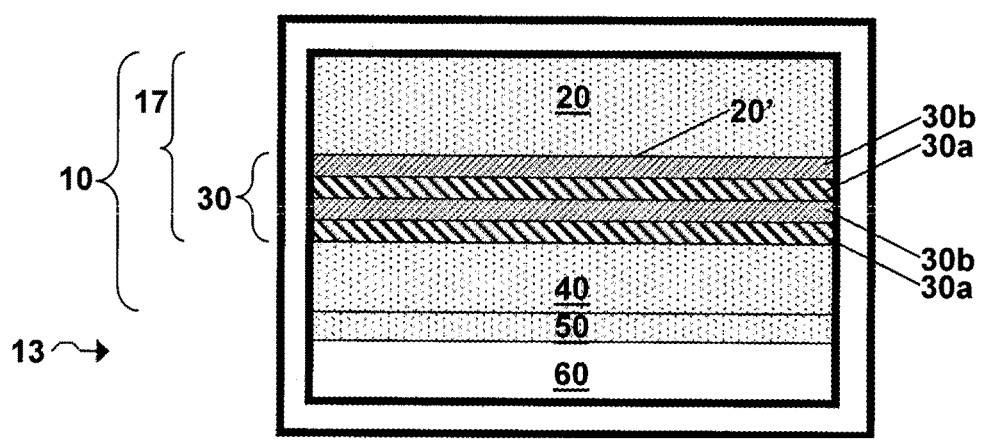
FIG. 3 shows an electrochemical cell.

As shown in FIG. 3, article 10 comprising anode 17 of FIG. 2C (or, in other embodiments, comprising article 15 of FIG. 2A or article 11 of FIG. 2B) may be incorporated with other components to form an electrochemical cell 13. The electrochemical cell includes a separator 50 positioned adjacent or within the electrolyte. In some cases, separator 50 may be formed from one or more of the polymers disclosed herein. The electrochemical cell may further include a cathode 60 comprising a cathode active material. As described above, protective structure 30 may be incorporated between electroactive layer 20 and electrolyte 40, and/or between electroactive layer 20 and cathode 60. In FIG. 3, protective structure 30 comprises a plurality of ion conductive layers 30a and polymer layers 30b. The ion conductive layers 30a and polymer layers 30b are arranged in an alternating pattern, although other arrangements are also possible. The polymer layers 30b may be formed from the polymers disclosed herein (e.g., as described in Section A). While four separate layers have been depicted, it should be appreciated that any suitable number of desired layers may be employed.

Multi-layered structures as described herein may have various overall thicknesses that can depend on, for example, the electrolyte, the cathode, or the particular use of the electrochemical cell. In some cases, a multi-layered structure can have an overall thickness less than or equal to 1 mm, less than or equal to 700 microns, less than or equal to 300 microns, less than or equal to 250 microns, less than or equal to 200 microns, less than or equal to 150 microns, less than or equal to 100 microns, less than or equal to 75 microns, less than or equal to 50 microns, less than or equal to 20 microns, less than or equal to 10 microns, less than or equal to 5 microns, or less than or equal to 2 microns. The multi-layered structure may have a thickness of greater than 100 nm, greater than 250 nm, greater than 500 nm, greater than 1 micron, greater than 2 microns, greater than 5 microns, greater than 10 microns, or greater than 20 microns. Other thicknesses are also possible. Combinations of the above-noted ranges are also possible.

When the polymer is to be employed as a protective layer, the thickness may be, for example, about 1 micron or less.

For example, the thickness may be between about 10 nm and about 200 nm (e.g., between about 20 nm and about 100 nm, or between about 50 nm and about 100 nm), or greater than 1 micron, e.g., between about 1 micron and about 50 microns (e.g., between about 1 micron and about 25 microns, or between about 25 microns and about 50 microns).

In general, the polymer layer may have any suitable thickness. The thickness may vary over a range from about 0.01 microns to about 20 microns. For instance, the thickness of the polymer layer may be between 0.05-0.15 microns thick, between 0.1-1 microns thick, between 1-5 microns thick, or between 5-10 microns thick. The thickness of a polymer layer may be, for example, less than or equal to 10 microns, less than or equal to 5 microns, less than or equal to 2.5 microns, less than or equal to 1 micron, less than or equal to 500 nm, less than or equal to 250 nm, less than or equal to 100 nm, less than or equal to 50 nm, less than or equal to 25 nm, or less than or equal to 10 nm. The polymer layer may also have a thickness of greater than 10 nm, greater than 25 nm, greater than 50 nm, greater than 100 nm, greater than 250 nm, greater than 500 nm, greater than 1 micron, or greater than 1.5 microns. For example, the polymer layer may have a thickness of 1 micron. Other thicknesses are also possible. Combinations of the above-noted ranges are also possible (e.g., a thickness of greater than 10 nm and less than or equal to 1 micron).

The electrochemical cell generally comprises an electroactive layer. The electroactive layer may form a portion of the anode. Suitable electroactive materials include, but are not limited to, lithium metal such as lithium foil and lithium deposited onto a conductive substrate, and lithium alloys (e.g., lithium-aluminum alloys and lithium-tin alloys). Lithium can be contained as one film or as several films, optionally separated by a protective layer. The anode may comprise one or more binder materials (e.g., polymers, etc.). Typically, the electroactive layer (e.g., as a portion of the electrode) comprises lithium metal or a lithium metal alloy.

Suitable electroactive materials for use as cathode active materials in the cathode of the electrochemical cells described herein may include, but are not limited to, electroactive transition metal chalcogenides, electroactive conductive polymers, sulfur, carbon, and/or combinations thereof. As used herein, the term "chalcogenides" pertains to compounds that contain one or more of the elements of oxygen, sulfur, and selenium. Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf, Ta, W, Re, Os, and Ir. In one embodiment, the transition metal chalcogenide is selected from the group consisting of the electroactive oxides of nickel, manganese, cobalt, and vanadium, and the electroactive sulfides of iron. In one embodiment, a cathode includes one or more of the following materials: manganese dioxide, iodine, silver chromate, silver oxide and vanadium pentoxide, copper oxide, copper oxyphosphate, lead sulfide, copper sulfide, iron sulfide, lead bismuthate, bismuth trioxide, cobalt dioxide, copper chloride, manganese dioxide, and carbon. In another embodiment, the cathode active layer comprises an electroactive conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. Examples of conductive polymers include polypyrroles, polyanilines, and polyacetylenes.

In some embodiments, electroactive materials for use as cathode active materials in electrochemical cells described herein include electroactive sulfur-containing materials. "Electroactive sulfur-containing materials," as used herein, relates to cathode active materials which comprise the element sulfur in any form, wherein the electrochemical activity involves the oxidation or reduction of sulfur atoms or moieties. The nature of the electroactive sulfur-containing materials useful in the practice of this invention may vary widely, as known in the art. For example, in one embodiment, the electroactive sulfur-containing material comprises elemental sulfur. In another embodiment, the electroactive sulfur-containing material comprises a mixture of elemental sulfur and a sulfur-containing polymer. Thus, suitable electroactive sulfur-containing materials may include, but are not limited to, elemental sulfur and organic materials comprising sulfur atoms and carbon atoms, which may or may not be polymeric. Suitable organic materials include those further comprising heteroatoms, conductive polymer segments, composites, and conductive polymers.

As an illustrative embodiment, an article or electrochemical cell described herein may include a Li-anode and a sulfur-cathode.

An ion conductive layer may include, for example, a ceramic layer, a glassy layer, a glassy-ceramic layer, or a secondary polymer layer. Suitable ion conductive materials include, for example, silica, alumina, or lithium containing glassy materials such as lithium phosphates, lithium aluminates, lithium silicates, lithium phosphorous oxynitrides, lithium tantalum oxide, lithium aluminosulfides, lithium titanium oxides, lithium silcosulfides, lithium germanosulfides, lithium aluminosulfides, lithium borosulfides, and lithium phosphosulfides, and combinations of two or more of the preceding. Suitable lithium alloys for use in the embodiments described herein can include alloys of lithium and aluminum, magnesium, silicium, indium, and/or tin. While these materials may be preferred in some embodiments, other cell chemistries are also contemplated.

As shown in FIG. 2A, in one set of embodiments, an article for use in an electrochemical cell may include an ion-conductive layer. In some embodiments, the ion conductive layer is a ceramic layer, a glassy layer, or a glassy-ceramic layer, e.g., an ion conducting ceramic/glass conductive to lithium ions. In other embodiments, the ion-conductive layer is a secondary polymer layer that is conductive to metal ions (e.g., lithium ions).

In some embodiments, a suitable secondary polymer include polymers that are highly conductive towards metal ions (e.g., lithium ions) and minimally conductive towards electrons. Examples of such secondary polymers include ionically conductive polymers, sulfonated polymers, and hydrocarbon polymers. The selection of the polymer will be dependent upon a number of factors including the properties of electrolyte and cathode used in the cell. Suitable ionically conductive polymers may include, e.g., ionically conductive polymers known to be useful in solid polymer electrolytes and gel polymer electrolytes for lithium electrochemical cells, such as, for example, polyethylene oxides. Suitable sulfonated polymers may include, e.g., sulfonated siloxane polymers, sulfonated polystyrene-ethylene-butylene polymers, and sulfonated polystyrene polymers. Suitable hydrocarbon polymers may include, e.g., ethylene-propylene polymers, polystyrene polymers, and the like.

Secondary polymers can also include crosslinked polymer materials, e.g., formed from the polymerization of monomers such as alkyl acrylates, glycol acrylates, polyglycol acrylates, polyglycol vinyl ethers, and polyglycol divinyl ethers, and polydivinyl poly(ethylene glycol). The crosslinked polymer materials may further comprise salts, for example, lithium salts, to enhance ionic conductivity.

Suitable glasses and/or ceramics include, but are not limited to, those that may be characterized as containing a "modifier" portion and a "network" portion, as known in the art. The modifier may include a metal oxide of the metal ion conductive in the glass or ceramic. The network portion may include a metal chalcogenide such as, for example, a metal oxide or sulfide. For lithium metal and other lithium-containing electrodes, an ion conductive layer may be lithiated or contain lithium to allow passage of lithium ions across it. Ion conductive layers may include layers comprising a material such as lithium nitrides, lithium silicates, lithium borates, lithium aluminates, lithium phosphates, lithium phosphorus oxynitrides, lithium silicosulfides, lithium germanosulfides, lithium oxides (e.g., $Li_2O$, $LiO$, $LiO_2$, $LiRO_2$, where R is a rare earth metal), lithium lanthanum oxides, lithium titanium oxides, lithium borosulfides, lithium aluminosulfides, and lithium phosphosulfides, and combinations thereof. The selection of the ion conducting material will be dependent on a number of factors including, but not limited to, the properties of electrolyte and cathode used in the cell.

In one set of embodiments, the ion conductive layer is a non-electroactive metal layer. The non-electroactive metal layer may comprise a metal alloy layer, e.g., a lithiated metal layer especially in the case where a lithium anode is employed. The lithium content of the metal alloy layer may vary from about 0.5% by weight to about 20% by weight, depending, for example, on the specific choice of metal, the desired lithium ion conductivity, and the desired flexibility of the metal alloy layer. Suitable metals for use in the ion conductive material include, but are not limited to, Al, Zn, Mg, Ag, Pb, Cd, Bi, Ga, In, Ge, Sb, As, and Sn. Sometimes, a combination of metals, such as the ones listed above, may be used in an ion conductive material.

In some embodiments, the ion conductive material is non-polymeric. In certain embodiments, the ion conductive material is defined in part or in whole by a layer that is highly conductive toward lithium ions (or other ions) and minimally conductive toward electrons. In other words, the ion conductive material may be one selected to allow certain ions, such as lithium ions, to pass across the layer, but to impede electrons, from passing across the layer. In some embodiments, the ion conductive material forms a layer that allows only a single ionic species to pass across the layer (i.e., the layer may be a single-ion conductive layer). In other embodiments, the ion conductive material may be substantially conductive to electrons.

The ion conductive layer may be formed or deposited by any suitable method such as using plasma conversion based techniques (e.g., plasma enhanced chemical vacuum deposition (PECVD)), electron beam evaporation, magnetron sputtering, chemical vapor deposition (e.g., laser enhanced chemical vapor deposition), thermal evaporation, jet vapor deposition, laser ablation and any other appropriate formation technique, deposition technique, and/or any appropriate combination thereof. The technique used may depend on the type of material being deposited, the thickness of the layer, etc. Alternatively, the layer of electroactive material may be exposed to a gas, such as nitrogen, under suitable conditions to react with the electroactive material at the surface of the electroactive material layer to form the ion conductive layer.

The thickness of an ion conductive material layer may vary over a range from about 1 nm to about 10 microns. For instance, the thickness of the ion conductive material layer may be between 1-10 nm thick, between 10-100 nm thick, between 100-1000 nm thick, between 1-5 microns thick, or between 5-10 microns thick. In some embodiments, the thickness of an ion conductive material layer may be, for example, less than or equal to 10 microns, less than or equal to 5 microns, less than or equal to 1000 nm, less than or equal to 500 nm, less than or equal to 250 nm, less than or equal to 100 nm, less than or equal to 50 nm, less than or equal to 25 nm, or less than or equal to 10 nm. In certain embodiments, the ion conductive layer may have a thickness of greater than or equal to 10 nm, greater than or equal to 25 nm, greater than or equal to 50 nm, greater than or equal to 100 nm, greater than or equal to 250 nm, greater than or equal to 500 nm, greater than or equal to 1000 nm, or greater than or equal to 1500 nm. Combinations of the above-referenced ranges are also possible (e.g., a thickness of greater than or equal to 10 nm and less than or equal to 500 nm). Other thicknesses are also possible. In some cases, the ion conductive layer has the same thickness as a polymer layer in a multi-layered structure.

In some embodiments, the conductivity of the polymer is determined in the dry state. The dry state ion conductivity of the polymer layers may vary over a range from, for example, about $10^{-7}$ S/cm to about $10^{-3}$ S/cm. In some embodiments, the dry state ion conductivity is between about 0.1 mS/cm and about 1 mS/cm, or between about 0.1 mS/cm and about 0.9 mS/cm, or between about 0.15 mS/cm and about 0.85 mS/cm. In certain embodiments, the dry state ion conductivity may be greater than or equal to $10^{-5}$ S/cm, greater than or equal to $10^{-4}$ S/cm. In some embodiments, the dry state ion conductivity may be, for example, less than or equal to $10^{-3}$ S/cm, less than or equal to $10^{-4}$ S/cm, less than or equal to $10^{-5}$ S/cm. Combinations of the above-referenced ranges are also possible (e.g., a dry state ion conductivity of greater than or equal to greater than or equal to $10^{-5}$ S/cm and less than or equal to $10^{-3}$ S/cm). Other dry state ion conductivities are also possible.

Dry-state ionic conductivity may be determined via impedance spectroscopy. In some embodiments, conductivity may be measured (e.g., in a dry state) in a "capacitor" type cell wherein a layer comprising a polymer (e.g., as described herein) is sandwiched between two electrodes. The electrodes may be inert (e.g., comprising Ni, Pt, Cu, or carbon) or active (e.g., Li, Li-alloy). Full spectra electrochemical impedance may be measured in a range of frequencies (e.g., from 0.1 Hz up to 1 MHz) with voltage amplitude of, for example, ~5-10 mV. The imaginary part of impedance can be plotted versus the real part for full frequencies range. For conductivity calculations the value R (Ohm) of intercept of the graph with real axis at high frequency is used in the formula:

$s = 1/R * T/A,$ wherein s is the conductivity (S/cm), R is the value of high frequency intercept (Ohm), T is the polymer layer thickness (cm), and A is the polymer film area sandwiched between electrodes (cm$^2$).

Polymers as described herein may also be incorporated into a electrochemical cell as a separator. For example, an electrochemical cell may comprise an anode comprising an electroactive layer, a separator comprising a polymer as described herein (e.g., as a polymer layer), and a cathode. Such a separator may be suitable for use in an electrochemical cell including an electroactive material comprising lithium (e.g., metallic lithium). Generally, a separator is interposed between a cathode and an anode in an electrochemical cell. The separator may separate or insulate the anode and the cathode from each other to prevent short circuiting, while permitting the transport of ions between the anode and the cathode. The separator may be porous, wherein the pores may be partially or substantially filled with electrolyte.

Separators may be supplied as free-standing films which are interleaved with the anodes and the cathodes during the fabrication of cells. Alternatively, the separator layer may be applied directly to the surface of one of the electrodes. The separator may be located between the anode and the cathode of the electrochemical cell, including adjacent (e.g., directly adjacent) to the anode and/or the cathode of the electrochemical cell. The thickness of the separator may be, for example, between about 1 micron and about 20 microns.

Articles described herein may further comprise a substrate, as is known in the art. Substrates are useful as a support on which to deposit the anode active material, and may provide additional stability for handling of thin lithium film anodes during cell fabrication. Further, in the case of conductive substrates, a substrate may also function as a current collector useful in efficiently collecting the electrical current generated throughout the anode and in providing an efficient surface for attachment of electrical contacts leading to an external circuit. A wide range of substrates are known in the art of anodes. Suitable substrates include, but are not limited to, those selected from the group consisting of metal foils, polymer films, metallized polymer films, electrically conductive polymer films, polymer films having an electrically conductive coating, electrically conductive polymer films having an electrically conductive metal coating, and polymer films having conductive particles dispersed therein. In one embodiment, the substrate is a metallized polymer film. In other embodiments, the substrate may be selected from non-electrically-conductive materials.

The electrolytes used in electrochemical or battery cells can function as a medium for the storage and transport of ions, and in the special case of solid electrolytes and gel electrolytes, these materials may additionally function as a separator between the anode and the cathode. Any liquid, solid, or gel material capable of storing and transporting ions may be used, so long as the material facilitates the transport of ions (e.g., lithium ions) between the anode and the cathode. The electrolyte is electronically non-conductive to prevent short circuiting between the anode and the cathode. In some embodiments, the electrolyte may comprise a non-solid electrolyte.

For example, electrolyte 40 as shown in FIG. 3 may comprise a polymer gel (e.g., a polymer gel electrolyte) formed from the polymers disclosed herein. As known to those of ordinary skill in the art, when a solvent is added to a polymer and the polymer is swollen in the solvent to form a gel, the polymer gel is more easily deformed (and, thus, has a lower yield strength) than the polymer absent the solvent. The yield strength of a particular polymer gel may depend on a variety of factors such as the chemical composition of the polymer, the molecular weight of the polymer, the degree of crosslinking of the polymer if any, the thickness of the polymer gel layer, the chemical composition of the solvent used to swell the polymer, the amount of solvent in the polymer gel, any additives such as salts added to the polymer gel, the concentration of any such additives, and the presence of any cathode discharge products in the polymer gel.

The polymer gel may be formed by swelling at least a portion of the polymer in a solvent to form the gel. The polymers may be swollen in any appropriate solvent such as those described in for liquid electrolytes. The solvent may include, for example, dimethylacetamide (DMAc), N-methylpyrolidone (NMP), dimethylsulfoxide (DMSO), dimethylformamide (DMF), sulfolanes, sulfones, and/or any other appropriate solvent. The polymer may be swollen in a solvent mixture comprising a solvent having affinity for the polymer and also solvents having no affinity for the polymer (so-called non-solvents) such as, for PVOH, 1,2.dimethoxyethane (DME), diglyme, triglyme, 1.3-dioxolane (DOL), THF, 1,4-dioxane, cyclic and linear ethers, esters (carbonates such as dimethylcarbonate and ethylene carbonate), acetals and ketals.

The polymers may be swellable in 1,2-dimethoxyethane and/or 1,3-dioxolane solvents. The solvents for preparing the polymer gel may be selected from the solvents described herein and may comprise electrolyte salts, including lithium salts selected from the lithium salts described herein.

Electrolyte layers described herein may have a thickness of at least 1 micron, at least 5 microns, at least 10 microns, at least 15 microns, at least 20 microns, at least 25 microns, at least 30 microns, at least 40 microns, at least 50 microns, at least 70 microns, at least 100 microns, at least 200 microns, at least 500 microns, or at least 1 mm. In some embodiments, the thickness of the electrolyte layer is less than or equal to 1 mm, less than or equal to 500 microns, less than or equal to 200 microns, less than or equal to 100 microns, less than or equal to 70 microns, less than or equal to 50 microns, less than or equal to 40 microns, less than or equal to 30 microns, less than or equal to 20 microns, less than or equal to 10 microns, or less than or equal to 50 microns. Other values are also possible. Combinations of the above-noted ranges are also possible. In some embodiments (e.g., where the polymer is to be employed as a gel polymer layer), the thickness may be, for example, between about 1 micron and about 10 microns.

In embodiments where more than one solvent is employed in an electrolyte (e.g., a liquid electrolyte or a gel polymer electrolyte), the solvents may be present in any suitable ratio, for example, at a ratio of a first solvent to a second solvent of about 1:1, about 1.5:1, about 2:1, about 1:1.5, or about 1:2. In certain embodiments, the ratio of the first and second solvents may between 100:1 and 1:100, or between 50:1 and 1:50, or between 25:1 and 1:25, or between 10:1 and 1:10, or between 5:1 and 1:5. In some embodiments, the ratio of a first solvent to a second solvent is greater than or equal to about 0.2:1, greater than or equal to about 0.5:1, greater than or equal to about 0.8:1, greater than or equal to about 1:1, greater than or equal to about 1.2:1, greater than or equal to about 1.5:1, greater than or equal to about 1.8:1, greater than or equal to about 2:1, or greater than or equal to about 5:1. The ratio of a first solvent to a second solvent may be less than or equal to about 5:1, less than or equal to about 2:1, less than or equal to about 1.8:1, less than or equal to about 1.5:1, less than or equal to about 1.2:1, less than or equal to about 1:1, less than or equal to about 0.8:1, or less than or equal to about 0.5:1. Combinations of the above-referenced ranges are also possible (e.g., a ratio of greater than or equal to about 0.8:1 and less than or equal to about 1.5:1). In some embodiments, the first solvent is 1,2-dimethoxyethane and the second solvent is 1,3-dioxolane, although it should be appreciated that any of the solvents described herein can be used as first or second solvents. Additional solvents (e.g., a third solvent) may also be included.

Examples of useful non-aqueous liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, acyclic ethers, cyclic ethers, glymes, polyethers, phosphate esters, siloxanes, dioxolanes, N-alkylpyrrolidones, substituted forms of the foregoing, and blends thereof. Examples of acyclic ethers that may be used include, but are not limited to, diethyl ether, dipropyl ether, dibutyl ether, dimethoxymethane, trimethoxymethane, dimethoxyethane, diethoxyethane, 1,2-dimethoxypropane, and 1,3-dimethoxypropane. Examples of cyclic ethers that may be used include, but are not limited to, tetrahydrofuran, tetrahydropyran, 2-methyltetrahydrofuran, 1,4-dioxane, 1,3-dioxolane, and trioxane. Examples of polyethers that may be used include, but are not limited to, diethylene glycol dimethyl ether (diglyme), triethylene glycol dimethyl ether (triglyme), tetraethylene glycol dimethyl ether (tetraglyme), higher glymes, ethylene glycol divinyl ether, diethylene glycol divinyl ether, triethylene glycol divinyl ether, dipropylene glycol dimethyl ether, and butylene glycol ethers. Examples of sulfones that may be used include, but are not limited to, sulfolane, 3-methyl sulfolane, and 3-sulfolene. Fluorinated derivatives of the foregoing are also useful as liquid electrolyte solvents. Mixtures of the solvents described herein can also be used.

The electrolyte can comprise one or more ionic electrolyte salts to provide ionic conductivity and one or more liquid electrolyte solvents, gel polymer materials, or polymer materials. Suitable non-aqueous electrolytes may include organic electrolytes comprising one or more materials selected from the group consisting of liquid electrolytes, gel polymer electrolytes, and solid polymer electrolytes.

As described herein, it may be desirable to determine if a polymer has advantageous properties as compared to other materials for particular electrochemical systems. Therefore, simple screening tests can be employed to help select between candidate materials. One simple screening test includes positioning a layer of the resulting polymer of the desired chemistry in an electrochemical cell, e.g., as a gel electrolyte layer, a separator, or a protective layer in a cell. The electrochemical cell may then undergo multiple discharge/charge cycles, and the electrochemical cell may be observed for whether inhibitory or other destructive behavior occurs (e.g., deterioration of an electroactive material surface) compared to that in a control system. If inhibitory or other destructive behavior is observed during cycling of the cell, as compared to the control system, it may be indicative of decomposition, or other possible degradation mechanisms of the polymer, within the assembled electrochemical cell. Using the same electrochemical cell it is also possible to evaluate the electrical conductivity and ion conductivity of the polymer using methods known to one of ordinary skill in the art. The measured values may be compared to select between candidate materials and may be used for comparison with the baseline material in the control.

Another simple screening test to determine if a polymer has suitable mechanical strength may be accomplished using any suitable mechanical testing methods including, but not limited to, durometer testing, yield strength testing using a tensile testing machine, and other appropriate testing methods. In one set of embodiments, the polymer has a yield strength that is greater than or equal to the yield strength of the electroactive material (e.g., metallic lithium). For example, the yield strength of the polymer may be greater than approximately 2 times, 3 times, or 4 times the yield strength of electroactive material (e.g., metallic lithium). In some embodiments, the yield strength of the polymer is less than or equal to 10 times, 8 times, 6 times, 5 times, 4 times, or 3 times the yield strength of electroactive material (e.g., metallic lithium). Combinations of the above-referenced ranges are also possible. In one specific embodiment, the yield strength of the polymer is greater than approximately 10 kg/cm² (i.e., approximately 980 kPa). Other yield strengths greater than or less than the above limits are also possible. Other simple tests to characterize the polymers may also be conducted by those of ordinary skill in the art.

In some embodiments in which the herein-disclosed polymers are used as a polymer gel electrolyte layer, the polymer layer is stable to an applied pressure of at least 10 kg/cm², at least 20 kg/cm², or at least 30 kg/cm² in a swollen state. In some embodiments, the stability may be determined in the electrolyte solvent to be used with the electrochemical cell. In some embodiments, the electrolyte is 8 wt % lithium bis trifluoromethanesulfonimide and 4 wt % $LiNO_2$ in a 1:1 mixture by weight of 1,2-dimethoxyethane and 1,3-dioxolane. In some embodiments, the total salt concentration in the electrolyte may be between about 8 and about 24 wt %. Other concentrations are also possible.

The electrochemical cells described herein may find use in a variety of applications, for example, for making or operating cars, computers, personal digital assistants, mobile telephones, watches, camcorders, digital cameras, thermometers, calculators, laptop BIOS, communication equipment or remote car locks.

C. DEFINITIONS

For convenience, certain terms employed in the specification, examples, and appended claims are listed here.

Definitions of specific functional groups and chemical terms are described in more detail below. For purposes of this invention, the chemical elements are identified in accordance with the Periodic Table of the Elements, CAS version, *Handbook of Chemistry and Physics*, 75th Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito: 1999, the entire contents of which are incorporated herein by reference.

The term "aliphatic," as used herein, includes both saturated and unsaturated, straight chain (i.e., unbranched), branched, acyclic, cyclic, or polycyclic aliphatic hydrocarbons, which are optionally substituted with one or more functional groups. As will be appreciated by one of ordinary skill in the art, "aliphatic" is intended herein to include, but is not limited to, alkyl, alkenyl, alkynyl, cycloalkyl, cycloalkenyl, and cycloalkynyl moieties. Thus, as used herein, the term "alkyl" includes straight, branched, and cyclic alkyl groups. An analogous convention applies to other generic terms such as "alkenyl," "alkynyl," and the like. Furthermore, as used herein, the terms "alkyl," "alkenyl," "alkynyl," and the like encompass both substituted and unsubstituted groups. In certain embodiments, as used herein, "lower alkyl" is used to indicate those alkyl groups (cyclic, acyclic, substituted, unsubstituted, branched or unbranched) having 1-6 carbon atoms.

In certain embodiments, the alkyl, alkenyl, and alkynyl groups employed in the compounds described herein contain 1-20 aliphatic carbon atoms. For example, in some embodiments, an alkyl, alkenyl, or alkynyl group may have greater than or equal to 2 carbon atoms, greater than or equal to 4 carbon atoms, greater than or equal to 6 carbon atoms, greater than or equal to 8 carbon atoms, greater than or equal to 10 carbon atoms, greater than or equal to 12 carbon atoms, greater than or equal to 14 carbon atoms, greater than or equal to 16 carbon atoms, or greater than or equal to 18 carbon atoms. In some embodiments, an alkyl, alkenyl, or alkynyl group may have less than or equal to 20 carbon atoms, less than or equal to 18 carbon atoms, less than or equal to 16 carbon atoms, less than or equal to 14 carbon atoms, less than or equal to 12 carbon atoms, less than or equal to 10 carbon atoms, less than or equal to 8 carbon atoms, less than or equal to 6 carbon atoms, less than or equal to 4 carbon atoms, or less than or equal to 2 carbon atoms. Combinations of the above-noted ranges are also possible (e.g., greater than or equal to 2 carbon atoms and less than or equal to 6 carbon atoms). Other ranges are also possible.

Illustrative aliphatic groups include, but are not limited to, for example, methyl, ethyl, n-propyl, isopropyl, cyclopropyl, —$CH_2$-cyclopropyl, vinyl, allyl, n-butyl, sec-butyl, isobutyl, tert-butyl, cyclobutyl, —$CH_2$-cyclobutyl, n-pentyl, sec-pentyl, isopentyl, tert-pentyl, cyclopentyl, —$CH_2$-cyclopentyl, n-hexyl, sec-hexyl, cyclohexyl, —$CH_2$-cyclohexyl moieties and the like, which again, may bear one or more substituents. Alkenyl groups include, but are not limited to, for example, ethenyl, propenyl, butenyl, 1-methyl-2-buten-1-yl, and the like. Representative alkynyl groups include, but are not limited to, ethynyl, 2-propynyl (propargyl), 1-propynyl, and the like.

The term "alkylene" as used herein refers to a bivalent alkyl group. An "alkylene" group is a polymethylene group, i.e., —$(CH_2)_z$—, wherein z is a positive integer, e.g., from 1 to 20, from 1 to 10, from 1 to 6, from 1 to 4, from 1 to 3, from 1 to 2, or from 2 to 3. A substituted alkylene chain is a polymethylene group in which one or more methylene hydrogen atoms are replaced with a substituent. Suitable substituents include those described herein for a substituted aliphatic group.

Generally, the suffix "-ene" is used to describe a bivalent group. Thus, any of the terms defined herein can be modified with the suffix "-ene" to describe a bivalent version of that moiety. For example, a bivalent carbocycle is "carbocyclylene", a bivalent aryl ring is "arylene", a bivalent benzene ring is "phenylene", a bivalent heterocycle is "heterocyclylene", a bivalent heteroaryl ring is "heteroarylene", a bivalent alkyl chain is "alkylene", a bivalent alkenyl chain is "alkenylene", a bivalent alkynyl chain is "alkynylene", a bivalent heteroalkyl chain is "heteroalkylene", a bivalent heterocycloalkyl ring is "heterocycloalkylene", a bivalent heteroalkenyl chain is "heteroalkenylene", a bivalent heteroalkynyl chain is "heteroalkynylene", and so forth.

The term "alkoxy," or "thioalkyl" as used herein refers to an alkyl group, as previously defined, attached to the parent molecule through an oxygen atom or through a sulfur atom. In certain embodiments, the alkoxy or thioalkyl groups contain a range of carbon atoms, such as the ranges of carbon atoms described herein with respect to the alkyl, alkenyl, or alkynyl groups. Examples of alkoxy, include but are not limited to, methoxy, ethoxy, propoxy, isopropoxy, n-butoxy, tert-butoxy, neopentoxy, and n-hexoxy. Examples of thioalkyl include, but are not limited to, methylthio, ethylthio, propylthio, isopropylthio, n-butylthio, and the like.

Some examples of substituents of the above-described aliphatic (and other) moieties of compounds of the invention include, but are not limited to aliphatic; heteroaliphatic; aryl; heteroaryl; arylalkyl; heteroarylalkyl; alkoxy; aryloxy; heteroalkoxy; heteroaryloxy; alkylthio; arylthio; heteroalkylthio; heteroarylthio; F; Cl; Br; I; —OH; —NO$_2$; —CN; —CF$_3$; —CH$_2$CF$_3$; —CHCl$_2$; —CH$_2$OH; —CH$_2$CH$_2$OH; —CH$_2$NH$_2$; —CH$_2$SO$_2$CH$_3$; —C(O)R$_x$; —CO$_2$(R$_x$); —CON(R$_x$)$_2$; —OC(O)R$_x$; —OCO$_2$R$_x$; —OCON(R$_x$)$_2$; —N(R$_x$)$_2$; —S(O)$_2$R$_x$; —NR$_x$(CO)R$_x$ wherein each occurrence of R$_x$ independently includes, but is not limited to, aliphatic, heteroaliphatic, aryl, heteroaryl, arylalkyl, or heteroarylalkyl, wherein any of the aliphatic, heteroaliphatic, arylalkyl, or heteroarylalkyl substituents described above and herein may be substituted or unsubstituted, branched or unbranched, cyclic or acyclic, and wherein any of the aryl or heteroaryl substituents described above and herein may be substituted or unsubstituted. Additional examples of generally applicable substituents are illustrated by the specific embodiments shown in the Examples that are described herein.

In general, the terms "aryl" and "heteroaryl", as used herein, refer to stable mono- or polycyclic, heterocyclic, polycyclic, and polyheterocyclic unsaturated moieties having preferably 3-14 carbon atoms, each of which may be substituted or unsubstituted. Substituents include, but are not limited to, any of the previously mentioned substituents, i.e., the substituents recited for aliphatic moieties, or for other moieties as disclosed herein, resulting in the formation of a stable compound. In certain embodiments described herein, "aryl" refers to a mono- or bicyclic carbocyclic ring system having one or two aromatic rings including, but not limited to, phenyl, naphthyl, tetrahydronaphthyl, indanyl, indenyl, and the like. In certain embodiments, the term "heteroaryl", as used herein, refers to a cyclic aromatic radical having from five to ten ring atoms of which one ring atom is selected from S, O, and N; zero, one, or two ring atoms are additional heteroatoms independently selected from S, O, and N; and the remaining ring atoms are carbon, the radical being joined to the rest of the molecule via any of the ring atoms, such as, for example, pyridyl, pyrazinyl, pyrimidinyl, pyrrolyl, pyrazolyl, imidazolyl, thiazolyl, oxazolyl, isooxazolyl, thiadiazolyl, oxadiazolyl, thiophenyl, furanyl, quinolinyl, isoquinolinyl, and the like.

It will be appreciated that aryl and heteroaryl groups can be unsubstituted or substituted, wherein substitution includes replacement of one, two, three, or more of the hydrogen atoms thereon independently with any one or more of the following moieties including, but not limited to: aliphatic; heteroaliphatic; aryl; heteroaryl; arylalkyl; heteroarylalkyl; alkoxy; aryloxy; heteroalkoxy; heteroaryloxy; alkylthio; arylthio; heteroalkylthio; heteroarylthio; —F; —Cl; —Br; —I; —OH; —NO$_2$; —CN; —CF$_3$; —CH$_2$CF$_3$; —CHCl$_2$; —CH$_2$OH; —CH$_2$CH$_2$OH; —CH$_2$NH$_2$; —CH$_2$SO$_2$CH$_3$; —C(O)R$_x$; —CO$_2$(R$_x$); —CON(R$_x$)$_2$; —OC(O)R$_x$; —OCO$_2$R$_x$; —OCON(R$_x$)$_2$; —N(R$_x$)$_2$; —S(O)$_2$R$_x$; —NR$_x$(CO)R$_x$, wherein each occurrence of R$_x$ independently includes, but is not limited to, aliphatic, heteroaliphatic, aryl, heteroaryl, arylalkyl, or heteroarylalkyl, wherein any of the aliphatic, heteroaliphatic, arylalkyl, or heteroarylalkyl substituents described above and herein may be substituted or unsubstituted, branched or unbranched, cyclic or acyclic, and wherein any of the aryl or heteroaryl substituents described above and herein may be substituted or unsubstituted. Additional examples of generally applicable substituents are illustrated by the specific embodiments shown in the Examples that are described herein.

The term "cycloalkyl," as used herein, refers specifically to groups having three to seven, preferably three to ten carbon atoms. Suitable cycloalkyls include, but are not limited to cyclopropyl, cyclobutyl, cyclopentyl, cyclohexyl, cycloheptyl and the like, which, as in the case of other aliphatic, heteroaliphatic, or heterocyclic moieties, may optionally be substituted with substituents including, but not limited to aliphatic; heteroaliphatic; aryl; heteroaryl; arylalkyl; heteroarylalkyl; alkoxy; aryloxy; heteroalkoxy; heteroaryloxy; alkylthio; arylthio; heteroalkylthio; heteroarylthio; —F; —Cl; —Br; —I; —OH; —NO$_2$; —CN; —CF$_3$; —CH$_2$CF$_3$; —CHCl$_2$; —CH$_2$OH; —CH$_2$CH$_2$OH; —CH$_2$NH$_2$; —CH$_2$SO$_2$CH$_3$; —C(O)R$_x$; —CO$_2$(R$_x$); —CON(R$_x$)$_2$; —OC(O)R$_x$; —OCO$_2$R$_x$; —OCON(R$_x$)$_2$; —N(R$_x$)$_2$; —S(O)$_2$R$_x$; —NR$_x$(CO)R$_x$, wherein each occurrence of R$_x$ independently includes, but is not limited to, aliphatic, heteroaliphatic, aryl, heteroaryl, arylalkyl, or heteroarylalkyl, wherein any of the aliphatic, heteroaliphatic, arylalkyl, or heteroarylalkyl substituents described above and herein may be substituted or unsubstituted, branched or unbranched, cyclic or acyclic, and wherein any of the aryl or heteroaryl substituents described above and herein may be substituted or unsubstituted. Additional examples of generally applicable substituents are illustrated by the specific embodiments shown in the Examples that are described herein.

The term "heteroaliphatic", as used herein, refers to aliphatic moieties that contain one or more oxygen, sulfur, nitrogen, phosphorus, or silicon atoms, e.g., in place of carbon atoms. Heteroaliphatic moieties may be branched, unbranched, cyclic or acyclic and include saturated and unsaturated heterocycles such as morpholino, pyrrolidinyl, etc. In certain embodiments, heteroaliphatic moieties are substituted by independent replacement of one or more of the hydrogen atoms thereon with one or more moieties including, but not limited to aliphatic; heteroaliphatic; aryl; heteroaryl; arylalkyl; heteroarylalkyl; alkoxy; aryloxy; heteroalkoxy; heteroaryloxy; alkylthio; arylthio; heteroalkylthio; heteroarylthio; —F; —Cl; —Br; —I; —OH; —NO$_2$; —CN; —CF$_3$; —CH$_2$CF$_3$; —CHCl$_2$; —CH$_2$OH; —CH$_2$CH$_2$OH; —CH$_2$NH$_2$; —CH$_2$SO$_2$CH$_3$; —C(O)R$_x$; —CO$_2$(R$_x$); —CON(R$_x$)$_2$; —OC(O)R$_x$; —OCO$_2$R$_x$; —OCON(R$_x$)$_2$; —N(R$_x$)$_2$; —S(O)$_2$R$_x$; —NR$_x$(CO)R$_x$, wherein each occurrence of R$_x$ independently includes, but is not limited to, aliphatic, heteroaliphatic, aryl, heteroaryl, arylalkyl, or heteroarylalkyl, wherein any of the aliphatic, heteroaliphatic, arylalkyl, or heteroarylalkyl substituents described above and herein may be substituted or unsubstituted, branched or unbranched, cyclic or acyclic, and wherein any of the aryl or heteroaryl substituents described above and herein may be substituted or unsubstituted. Additional examples of generally applicable substituents are illustrated by the specific embodiments shown in the Examples that are described herein.

The term "vinyl group" is given its ordinary meaning in the art and refers the group —CH=CH$_2$, which may be optionally substituted.

The term "thiol group" is given its ordinary meaning in the art and refers the group —SH.

The term "thiocyanate group" is given its ordinary meaning in the art and refers the group —S—C≡N.

The term "isocyanate group" is given its ordinary meaning in the art and refers the group N=C=O.

The term "isothiocyanate group" is given its ordinary meaning in the art and refers the group —N=C=S.

The term "epoxy group" is given its ordinary meaning in the art and refers the group:

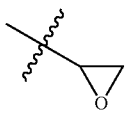

which may be optionally substituted.

The term "cyanate ester group" is given its ordinary meaning in the art and refers the group —O—C≡N.

The terms "halo" and "halogen" as used herein refer to an atom selected from fluorine, chlorine, bromine, and iodine.

The term "haloalkyl" denotes an alkyl group, as defined above, having one, two, or three halogen atoms attached thereto and is exemplified by such groups as chloromethyl, bromoethyl, trifluoromethyl, and the like.

The term "heterocycloalkyl" or "heterocycle", as used herein, refers to a non-aromatic 5-, 6-, or 7-membered ring or a polycyclic group, including, but not limited to a bi- or tri-cyclic group comprising fused six-membered rings having between one and three heteroatoms independently selected from oxygen, sulfur and nitrogen, wherein (i) each 5-membered ring has 0 to 1 double bonds and each 6-membered ring has 0 to 2 double bonds, (ii) the nitrogen and sulfur heteroatoms may be optionally be oxidized, (iii) the nitrogen heteroatom may optionally be quaternized, and (iv) any of the above heterocyclic rings may be fused to a benzene ring. Representative heterocycles include, but are not limited to, pyrrolidinyl, pyrazolinyl, pyrazolidinyl, imidazolinyl, imidazolidinyl, piperidinyl, piperazinyl, oxazolidinyl, isoxazolidinyl, morpholinyl, thiazolidinyl, isothiazolidinyl, and tetrahydrofuryl. In certain embodiments, a "substituted heterocycloalkyl or heterocycle" group is utilized and as used herein, refers to a heterocycloalkyl or heterocycle group, as defined above, substituted by the independent replacement of one, two or three of the hydrogen atoms thereon with but are not limited to aliphatic; heteroaliphatic; aryl; heteroaryl; arylalkyl; heteroarylalkyl; alkoxy; aryloxy; heteroalkoxy; heteroaryloxy; alkylthio; arylthio; heteroalkylthio; heteroarylthio; —F; —Cl; —Br; —I; —OH; —NO$_2$; —CN; —CF$_3$; —CH$_2$CF$_3$; —CHCl$_2$; —CH$_2$OH; —CH$_2$CH$_2$OH; —CH$_2$NH$_2$; —CH$_2$SO$_2$CH$_3$; —C(O)R$_x$; —CO$_2$(R$_x$); —CON(R$_x$)$_2$; —OC(O)R$_x$; —OCO$_2$R$_x$; —OCON(R$_x$)$_2$; —N(R$_x$)$_2$; —S(O)$_2$R$_x$; —NR$_x$(CO)R$_x$, wherein each occurrence of R$_x$ independently includes, but is not limited to, aliphatic, heteroaliphatic, aryl, heteroaryl, arylalkyl, or heteroarylalkyl, wherein any of the aliphatic, heteroaliphatic, arylalkyl, or heteroarylalkyl substituents described above and herein may be substituted or unsubstituted, branched or unbranched, cyclic or acyclic, and wherein any of the aryl or heteroaryl substituents described above and herein may be substituted or unsubstituted. Additional examples of generally applicable substituents are illustrated by the specific embodiments shown in the Examples which are described herein.

The term "independently selected" is used herein to indicate that the R groups can be identical or different.

EXAMPLES

Non-limiting examples of the polymers described herein are illustrated by the following working examples.

Example 1

The following examples describe polymers formed via reaction monomers comprising at least two thiol groups and monomers comprising two vinyl groups.

Figure 4:
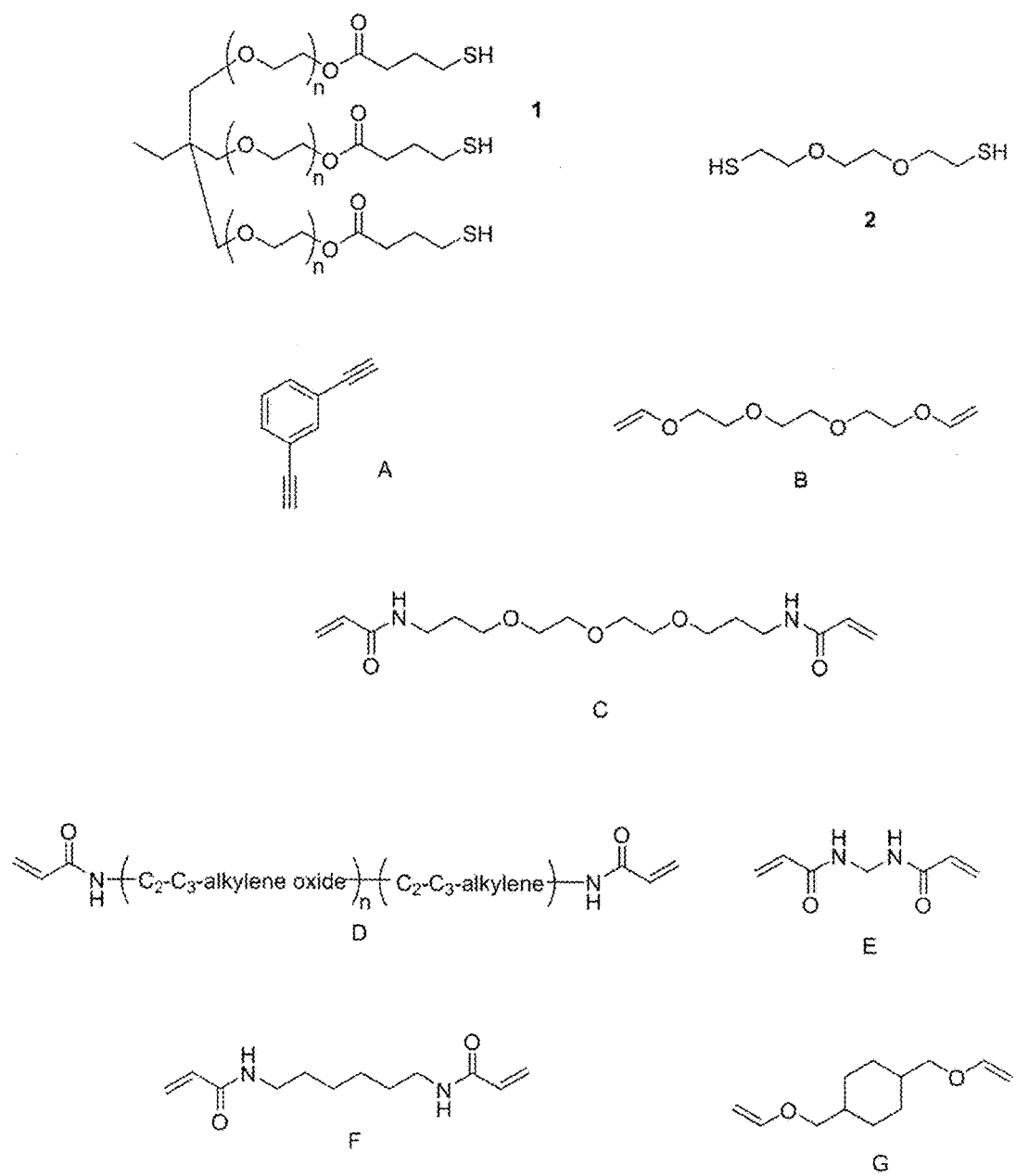
FIG. 4 shows non-limiting examples of monomers.
Figure 5:
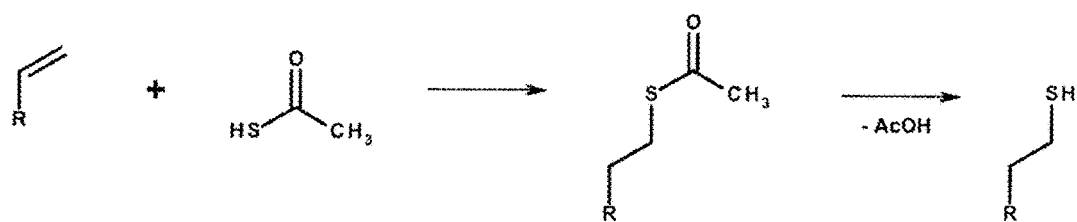
FIG. 5 shows a synthetic route to hydrolytically stable thiols.

A variety of dithiol and trithiol compounds are available commercially (e.g., from Bruno Bock Chemische Fabrik GmbH & Co. KG Marschacht, Germany, or from Sigma Aldrich). FIG. 4 shows a thiol molecule 1 employed in this example. Two different grades, the ETTMP 700 and ETTMP 1300 grades, both referring to the molecular weight of the PEG chains, were employed. $^1$H NMR spectroscopy revealed n=2-3 for the ETTMP 700 and n=6-7 for the ETTMP 1300. In some cases, the latter thiol was found to give improved ionic conductivities as compared to the former, which may be a result of the increased amount of PEG to better support Li ion transport. In some cases, commercial sources of thiols may contain the related ester. The presence of the ester may affect the use in Li/S battery application since polysulfide attack can result in the decomposition of the polymer. Accordingly, ester-free versions of the thiols (e.g., hydrolytically stable thiols) may be desirable and may be prepared, for example, according to the scheme shown in FIG. 5.

Divinyl monomers employed to synthesize the polymers are also shown in FIG. 4 (A-E). These are mainly the hydrolytically stable vinyl ethers (B), acrylamides (C-F) and non-activated olefins like A. In some embodiments, the reaction of B with 1 and 2, respectively, occurred without the addition of a photoinitiator (e.g., Irgacure® 819). Similar outcomes were observed with hexamethylene divinylether and cyclohexyl divinylether. The reactivity of the acrylamides C-F in the thiol-ene addition with 1 proceeded as expected. Solutions in a solvent (e.g., MEK, dioxolane) were prepared and the doctor-bladed films were UV-cured at 385 nm with 1 wt.-% using Irgacure® 819 as a photoinitiator. In some cases, upon storage at +6° C., the prepared solutions gelled after a week.

In order to investigate the ionic conductivities, thiol-ene films were cured on glass and subjected to impedance spectroscopy. Mechanical integrity of all films was visually inspected. The impact of electrolyte uptake was observed. A small piece of thiol-ene film coated Ni substrate was attached to a lid and placed inside of a vial that was filled with the solvent mixture. Due to the vapor pressure, the films were in contact with the electrolyte and the changes of the film morphology were observed.

Similar to the thiol-ene addition, the thiol-yne reaction is also known, where thiols may undergo a radical addition reaction with alkyne triple bonds. In this example, 1,3-diethinyl benzene was chosen as a comonomer. Long-term stable solutions of 1 and A in the presence of Irgacure® 819 were prepared, and the solutions rapidly polymerized upon exposure to UV light. For comparison, the thiol-ene polymer films were blended with 10 wt.-% PEO of 100,000 g/mol molecular weight, and the ionic conductivities of the resulting films are summarized in Table 1.

Film thicknesses were in the range between about 1 and about 20 microns, and typically between about 5 and about 10 microns. However, greater film thicknesses were also achieved, some in the range of about 50 to about 75 microns. Free-standing films of even greater thicknesses (over 1 mm) were also achieved. It was found that films having thicknesses greater than about 1 mm may bulk-polymerize.

TABLE 1

Ionic conductivities of thiol-ene polymer
films prepared from 1 and A.

| | ionic conductivity [S/cm] | | | |
|---|---|---|---|---|
| | ETTMP 700 | ETTMP 700 + 10% PEO | ETTMP 1300 | ETTMP 1300 + 10% PEO |
| 1,3-diethinyl-benzene | $1.2 \times 10^{-6}$ | $2.9 \times 10^{-8}$ | $3.7 \times 10^{-6}$ | $1.6 \times 10^{-6}$ |

The dry state ionic conductivities of the cured films were generally >$10^{-6}$ S/cm, as determined by impedance spectroscopy. The addition of PEO had essentially no influence on the conductivity when ETTMP 1300 was used. However, the addition of PEO to the ETTMP 700 grade reduced the conductivity by two orders of magnitude. This may be due to the inability of ETTMP 700 (n=2-3) to accommodate the Li conductive salt, which preferentially goes into the PEO phase. This, however, is known to be a poor conductor at room temperature due to its crystallinity (<<$10^{-6}$ S/cm). The mechanical observations of the films revealed relatively soft and tacky films. Tackiness and softness were reduced with the addition of PEO. A challenge arose with film quality after electrolyte uptake. Within a few minutes the polymer coating wrinkled and visible cracks on the surface were observed.

Another class of ene-components investigated have been the bisacrylamides. Polar, PEGylated versions (C,D) were synthesized whereas the unpolar derivatives (E,F) were purchased from Aldrich. See Tables 2-4.

TABLE 2

Ionic conductivities: thiol-ene polymer films prepared
from stoichiometric reaction of 1 with C-F.

| | Ionic conductivity [S/cm] ene compound | | | |
|---|---|---|---|---|
| thiol compound | C | D | E | F |
| None | $2 \times 10^{-11}$ | $1.2 \times 10^{-6}$ | —/— | —/— |
| ETTMP 700 | $2.5 \times 10^{-6}$ | $1.0 \times 10^{-5}$ | | |
| ETTMP 700 + 10% PEO | $7.4 \times 10^{-7}$ | $1.5 \times 10^{-6}$ | —/— | —/— |
| ETTMP 1300 | $1.0 \times 10^{-5}$ | $8.6 \times 10^{-6}$ | | |
| ETTMP 1300 + 10% PEO | $5.7 \times 10^{-7}$ | $1.3 \times 10^{-6}$ | —/— | —/— |

TABLE 3

Film properties of thiol-ene polymer films prepared
from stoichiometric reaction of 1 with C-F.

| | Mechanical dry film properties ene compound | | | |
|---|---|---|---|---|
| thiol compound | C | D | E | F |
| None | clear, not tacky | clear, slight tack | —/— | —/— |
| ETTMP 700 | clear, tacky | clear, very tacky | | |
| ETTMP 700 + 10% PEO | hazy, slight tack | hazy, slight tack | —/— | —/— |
| ETTMP 1300 | clear, slight tack | clear, very tacky | | |
| ETTMP 1300 + 10% PEO | hazy, not tacky | hazy, not tacky | —/— | —/— |

TABLE 4

Electrolyte uptake: film properties of thiol-ene polymer films
prepared from stoichiometric reaction of 1 with C-F.

| | Film properties upon electrolyte uptake[1] ene compound | | | |
|---|---|---|---|---|
| thiol compound | C | D | E | F |
| None | many cracks | many cracks | —/— | —/— |
| ETTMP 700 | —/— | —/— | | |
| ETTMP 700 + 10% PEO | —/— | —/— | —/— | —/— |
| ETTMP 1300 | no cracks | —/— | | |
| ETTMP 1300 + 10% PEO | —/— | —/— | —/— | —/— |

[1]as recorded after an hour

In Table 2, the ionic conductivities of the cured films are presented. Tables 3 and 4 describe the mechanical properties of the films upon visual inspection before and after electrolyte uptake, respectively. For comparison, films were cast and cured from the pure bisacrylamide monomers C and D without thiol compound. The relatively short chain monomer C exhibited a very low conductivity ($10^{-11}$ S/cm) whereas the Jeffamine® derivative D comprised a higher dry state ionic conductivity ($10^{-6}$ S/cm). The PEG chain of this Jeffamine® based monomer is not only longer, but also contains propylene oxide units which may help to increase the flexibility of the chain. Therefore, cured resin of D can function as a conductor. Immediate crack formation upon electrolyte uptake was observed. For C and D alike, within the first minute of contact with electrolyte vapor crack formation occurred and propagated throughout the whole film area in less than an hour.

Copolymer films prepared in a thiol-ene reaction of trithiol 1 with the bisacrylamides C-F showed similar dry state ionic conductivities. The combination with the Jeffamine® based monomer D and the ETTMP trithiol (regardless of its molecular weight) reached good values; however, improved values were observed without the blending of linear PEO. As noted above, linear PEO can host considerable amounts of LiTFSI conducting salt, which can become trapped in the crystalline, less mobile phase and may not substantially contribute to the conductivity. Before electrolyte uptake, the polymer film 1+C was clear and slightly tacky, and the film 1+D was clear and tackier. In all cases, the addition of 10 wt.-% PEO resulted in a significant decrease of film tackiness. For polymer film 1+C, no crack formation observed after electrolyte uptake (after 8 hours). However, after 1 week dewetting from the nickel foil was observed, followed by crack formation throughout the film.

Additionally, the bisacrylamide monomer may be employed in excess with respect to the thiol compound. After rapid thiol-ene polymerization, homopolymerization of the excess bisacrylamide may occur and an interpenetrating network (IPN) may be constructed. The softer thiol-ene network may be penetrated by the harder, crosslinked polyacrylamide that supports the overall mechanical properties of the film. The reaction of 1 with a 3-fold excess of Jeffamine® derivative D exhibited better film qualities than the ones originating from a stoichiometric reaction, and tackiness was no longer an issue. The ionic conductivities were acceptable (Table 5).

TABLE 5

Ionic conductivities of thiol-ene polymer films prepared
from reaction of 1 with excess amount of D.

| thiol compound | σ [S/cm] | film properties |
|---|---|---|
| ETTMP 700 | $1.5 \times 10^{-6}$ | clear, not tacky |
| ETTMP 1300 | $3.5 \times 10^{-6}$ | hazy, not tacky |

In summary, thiole-ene chemistry has been shown to be a viable route for the in situ preparation of protected Li anodes. The reaction proceeded rapidly and films can efficiently be cured on various substrates. The films had ionic conductivities approaching $10^{-5}$ S/cm while having acceptable mechanical properties.

EXPERIMENTAL

Thiol-ene films were prepared by casting a 5 to 50 wt.-% solution of the comonomer composition (1:1 with respect to the functionality) in a relatively low boiling and inert solvent like dioxane, dioxolane, or methyl ethyl ketone (MEK) on a substrate of choice. The solution further contained 5 to 10 wt.-% LiTFSI as conducting salt. The curing of the freshly cast film was accomplished with the radical photoinitiator Irgacure® 819 using LED lamps as UV source. The irradiation process occurred at λ=385 nm with a power density of 20 mW/cm² for 2.5 minutes. Depending on the application three different substrates were employed: 1) glass plate or optical PET foil (e.g., for use for the determination of the dry state Li ion conductivities), 2) nickel foil (e.g., for use to determine the swelling, electrolyte uptake, and mechanical stability), and 3) lithium foil (e.g., for use for full cell measurements in a Li/S battery (with C/S cathode).

Example 2

Mixtures containing mole functional ratios of 1:1, 1:2, and 1:3 trimethylolpropane tris(3-mercaptopropionate):triethylene glycol divinyl ether with 2% weight triarylsulfonium hexafluoroantimonate salts were prepared. The mixtures were diluted with dry 1,3-dioxolane, dioxane, or methyl ethyl ketone (20-80% monomer/solvent) and coated on three substrate (glass, copper foil, and aluminium foil) and exposed to UV light (λ=385 nm) under Ar atmosphere. The monomers were completely cured after UV exposure. The films were allowed to dry overnight to allow solvent to evaporate. The resulting films had thicknesses of about 12 microns, as measured by profilometry and drop gauges.

Example 3

Mole functional ratios of 1:1 and 1:3 Trimethylolpropane tris(3-mercaptopropionate):triethylene glycol divinyl ether and Trimethylolpropane tris(3-mercaptopropionate):1,4-cyclohexanedimethanol divinyl ether with 2% weight triarylsulfonium hexafluorophospate salts were prepared. The mixtures were diluted with 1,3-dioxolane, or in some cases methyl ethyl ketone or dioxane, to 20-80% solids or monomer content and coated on three substrate (glass and copper foil) and exposed to UV light (λ=385 nm) under Ar atmosphere. The monomers were completely cured after UV exposure. The films were allowed to dry overnight to allow solvent to evaporate. The resulting films had thicknesses of about 12 microns, as measured by profilometry.

Example 4

In a first example, to 2.31 g dioxane was added 0.72 g thiodiethanethiol and 1.59 triethyleneglycol divinyl ether. Solutions were stirred prior to addition of 0.05 g triarylsulfonium hexaantiomate salts, which served as a cationic photoinitiator for vinyl groups. The resulting solution was coated on a metal substrate such as aluminum foil and passed under a UV lamp (λ=385 nm) with web speed 2 ft/min to polymerize the material. The resulting films had thicknesses of about 10 microns. The resulting gel conductivity of the polymer was $1.3*10^{-4}$ S/cm.

In a second example, to 2.31 g dioxane was added 0.53 g thiodiethanethiol and 1.78 g triethyleneglycol divinyl ether. Solutions were stirred prior to addition of 0.05 g triarylsulfonium hexaantiomate salt. The resulting solution was cured in the same manner described above. The resulting films had thicknesses of about 10 microns. Gel conductivity was $2.9*10^{-5}$ S/cm In a third example, to 0.16 g LiTFSI was added 0.72 g thiodiethanethiol and 1.59 triethyleneglycol divinyl ether. Solutions were stirred prior to addition of 2.31 g dioxane and 0.05 g triarylsulfonium hexaantiomate salt. The resulting solutions were coated on glass, PET, and/or metal substrate such as aluminum foil and then cured/polymerized by passing under a UV lamp with web speed 2 ft/min.

In a fourth example, to 2.31 g 1,3-dioxolane was added 1.31 g trimethylolpropane tris(3-mercaptopropionate) and 1.08 g triethyleneglycol divinyl ether. Once the resulting solution was stirred for 1 hour, 0.05 g triarylsulfonium hexaantiomate salt was added and stirred until a homogeneous solution was formed. The resulting solution was coated on a metal substrate such as copper foil and then passed under a UV lamp with web speed 2 ft/min to ensure curing. Gel conductivity was $1.6*10^{-4}$ S/cm In a fifth example, to 2.31 g 1,3-dioxolane was added 0.91 g trimethylolpropane tris(3-mercaptopropionate) and 1.46 g triethyleneglycol divinyl ether. Once the resulting solution was stirred for 1 hour, 0.05 g triarylsulfonium hexaantiomate salt was added and stirred until a homogeneous solution was formed. The resulting solution was coated on a metal substrate such as copper foil and then passed under a UV lamp with web speed 2 ft/min to ensure curing. The resulting films had thicknesses of about 10 microns. Gel conductivity was ~$1*10^{-5}$ S/cm In a sixth example, to 2.31 g 1,3-dioxolane was added 0.70 g trimethylolpropane tris(3-mercaptopropionate) and 1.61 g triethyleneglycol divinyl ether. Once the resulting solution was stirred for 1 hour, 0.05 g triarylsulfonium hexaantiomate salt was added and stirred until a homogeneous solution was formed. The resulting solution was coated on a metal substrate such as copper foil and then passed under a UV lamp with web speed 2 ft/min to ensure curing. The resulting films had thicknesses of about 10 microns. Gel conductivity was $3.1*10^{-5}$ S/cm.

In a seventh example, to 2.31 g dioxane was added 1.31 g trimethylolpropane tris(3-mercaptopropionate) and 1.00 g 1,4-cyclohexanediol divinyl ether. Next, 0.05 g triarylsulfonium hexaantiomate salt was added to the solution and stirred until a homogeneous solution was formed. The resulting solution was coated on a metal substrate and then passed under a UV lamp with webspeed 2 ft/min to polymerize the coating. The resulting films had thicknesses of about 10 microns. Gel conductivity was $1.59*10^{-6}$ S/cm.

In an eighth example, to 2.31 g dioxane was added 1.90 g trimethylolpropane tris(3-mercaptopropionate) and 0.81 g butanediol divinyl ether. After stirring, 0.05 g triarylsulfonium hexaantiomate salt was added to the solution and mixed until a homogeneous solution was formed. The resulting solution was coated on a metal substrate and then passed under a UV lamp with webspeed 2 ft/min to polymerize the coating. The resulting films had thicknesses of about 10 microns. The gel conductivity was $1.5*10^{-5}$ S/cm.

Film thickness of all above examples were measured using profilometery and drop gauges. Gel conductivity of the above examples was measured using impedance spectroscopy.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of t and an he present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An electrochemical cell comprising:
   a cathode;
   an electroactive layer, wherein the electroactive layer comprises an anode active material; and
   a polymer layer comprising a polymer comprising polymerized units of a first type of monomer comprising at least two thiol groups, a second type of monomer comprising at least one vinyl group or at least one alkynyl group, and an optional third type of monomer, wherein the polymer layer is arranged between the cathode and the electroactive layer comprising the anode active material.

2. The electrochemical cell of claim 1, wherein:
   (a) the first type of monomer comprises two thiol groups or three thiol groups; and
   (b) the second type of monomer comprises 1-3 vinyl groups or 1-3 alkynyl groups.

3. The electrochemical cell of claim 1, wherein the first type of monomer is a compound of Formula (A) or Formula (B),

HS-L$^1$-SH       (A)

R$^a$C(L$^2$SH)$_3$       (B)

wherein:
L$^1$ or L$^2$ is optionally substituted alkylene, optionally substituted heteroalkylene, optionally substituted cycloalkylene, optionally substituted heterocycloalkylene, optionally substituted arylene, or optionally substituted heteroarylene; and
R$^a$ is H, alkyl, or -L$^2$SH.

4. The electrochemical cell of claim 3, wherein the first type of monomer is a compound of Formula (A), wherein L$^1$ is —(C$_2$-C$_3$-alkylene oxide)$_n$-(C$_2$-C$_3$-alkylene)- or —(C$_2$-C$_3$-alkylene oxide)$_n$-C(O)—(C$_2$-C$_3$-alkylene)-, wherein the C$_2$-C$_3$-alkylene oxide is independently ethylene oxide or 1,2-propylene oxide, wherein n is an integer from 1 to 100.

5. The electrochemical cell of claim 3, wherein the first type of monomer is a compound of Formula (B), wherein L$^2$ is —(C$_1$-C$_3$-alkylene)-(C$_2$-C$_3$-alkylene oxide)$_n$-(C$_1$-C$_3$-alkylene)- or —(C$_1$-C$_3$-alkylene)-(C$_2$-C$_3$-alkylene oxide)$_n$-OC(O)—(C$_1$-C$_3$-alkylene) wherein the C$_2$-C$_3$-alkylene oxide is independently ethylene oxide or 1,2-propylene oxide, —R$^a$ is H or alkyl, and n is an integer from 1 to 10.

6. The electrochemical cell of claim 1, wherein the second type of monomer is a compound of Formula (C),

  (C)

wherein:
X$^1$ is —CR$^c$=CH$_2$ or —C≡CH;
L$^3$ is optionally substituted alkylene, optionally substituted heteroalkylene, optionally substituted cycloalkylene, optionally substituted heterocycloalkylene, optionally substituted arylene, optionally substituted heteroarylene, —(CO)—, —(CO)O—, —(CO)NH—, —C=NH—,
—NH—, —C(OH)—, —O—, or —S—;
R$^b$ is optionally substituted alkyl, optionally substituted heteroalkyl, optionally substituted cycloalkyl, optionally substituted heterocycloalkyl, optionally substituted aryl, or optionally substituted heteroaryl; and
R$^c$ is H or alkyl, or wherein the second type of monomer is a compound of Formula (D),

  (D)

wherein:
X$^2$ and X$^3$ are —CR$^d$=CH$_2$ or —C≡CH;
L$^4$ is optionally substituted alkylene, optionally substituted heteroalkylene, optionally substituted cycloalkylene, optionally substituted heterocycloalkylene, optionally substituted arylene, optionally substituted heteroarylene, —(CO)—, —(CO)O—, —(CO)NH—, —C=NH—, —NH—, —C(OH)—, —O—, or —S—; and
R$^d$ is H or alkyl.

7. The electrochemical cell of claim 6, wherein L$^3$ or L$^4$ comprises an alkylene oxide chain.

8. The electrochemical cell of claim 6, wherein L$^4$ has the structure,

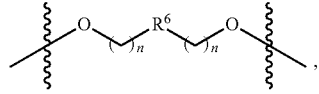

wherein each n is independently 0-10 and R$^6$ is optionally substituted alkylene, optionally substituted heteroalkylene, optionally substituted cycloalkylene, optionally substituted heterocycloalkylene, optionally substituted arylene, or optionally substituted heteroarylene, or, wherein L$^4$ is —(O)—(C$_2$-C$_3$-alkylene oxide)$_n$-, wherein the C$_2$-C$_3$-alkylene oxide is independently ethylene oxide or 1,2-propylene oxide, and n is an integer from 1 to 10, or, wherein L$^4$ has the structure,

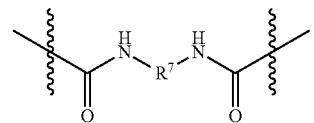

wherein:
R$^7$ is optionally substituted alkylene, optionally substituted heteroalkylene, optionally substituted cycloalkylene, optionally substituted heterocycloalkylene, optionally substituted arylene, or optionally substituted heteroarylene.

9. The electrochemical cell of claim 1, wherein the second type of monomer is one of the following compounds,

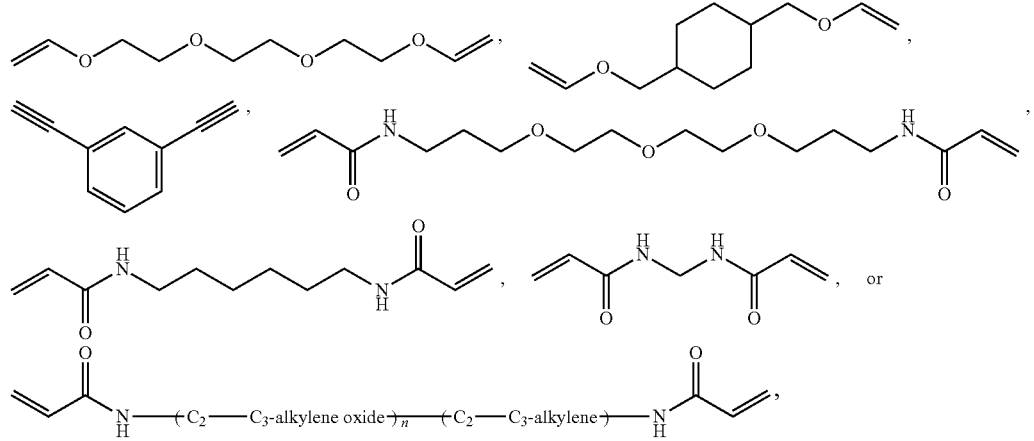

wherein n is an integer from 1-100.

10. The electrochemical cell of claim 1, wherein the polymer of the polymer layer comprises the third type of monomer, and wherein the third type of monomer comprises at least one functional group(s) reactive with a thiol group.

11. The electrochemical cell of claim 10, wherein the third type of monomer is a compound of Formula (E),

  (E)

wherein L$^5$ is alkylene, arylene, arylene-alkylene-arylene, or alkylene-arylene-alkylene, any of which is optionally substituted, and R$^e$ and R$^f$ are isocyanate groups, cyanate ester groups, thiocyanate groups, isothiocyanate groups, or epoxy groups.

12. The electrochemical cell of claim 1, wherein the polymer layer is arranged as a protective layer, as an electrolyte, or as a separator.

13. The electrochemical cell according to claim 1, wherein the electroactive layer comprises lithium.

14. The electrochemical cell according to claim 13, wherein the cathode comprises elemental sulfur.

15. The electrochemical cell of claim 4, wherein the first type of monomer is the compound

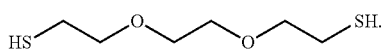

16. The electrochemical cell of claim 5, wherein the first type of monomer is the compound

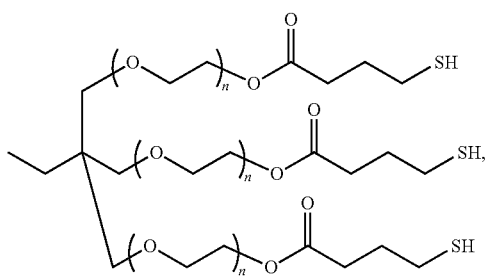

wherein n is an integer from 1 to 10.

17. The electrochemical cell of claim 7, wherein $L^3$ or $L^4$ comprises an alkylene oxide chain comprising a copolymer of ethylene oxide and 1,2-propylene oxide.

18. The electrochemical cell of claim 10, wherein the at least one functional group(s) reactive with a thiol group is an isocyanate group, a cyanate ester group, a thiocyanate group, a isothiocyanate group, or an epoxy group.

19. The electrochemical cell of claim 10, wherein the third type of monomer is one of the following compounds

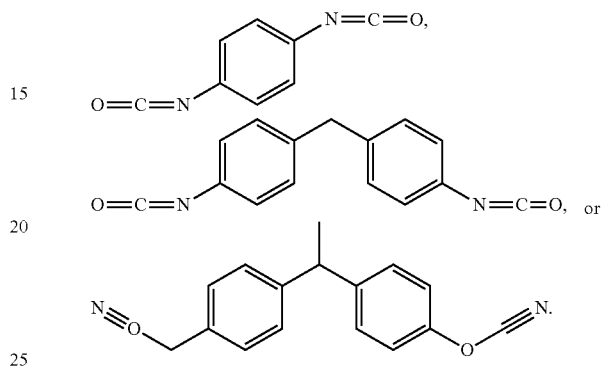

* * * * *